United States Patent
de Villiers et al.

(10) Patent No.: US 12,260,382 B2
(45) Date of Patent: Mar. 25, 2025

(54) EXCHANGING PHYSICAL CASH WITH AN ELECTRONIC FUNDS ACCOUNT

(71) Applicant: Gelliner Limited, Douglas (IM)

(72) Inventors: David de Villiers, Ballito (ZA); Martin Paul Moshal, Queens Way Quay (GI)

(73) Assignee: Gelliner Limited, Douglas (IM)

( * ) Notice: Subject to any disclaimer, the term of this patent is extended or adjusted under 35 U.S.C. 154(b) by 0 days.

(21) Appl. No.: 15/748,594

(22) PCT Filed: Aug. 5, 2016

(86) PCT No.: PCT/GB2016/052445
§ 371 (c)(1),
(2) Date: Jan. 29, 2018

(87) PCT Pub. No.: WO2017/025728
PCT Pub. Date: Feb. 16, 2017

(65) Prior Publication Data
US 2019/0005473 A1 Jan. 3, 2019

(30) Foreign Application Priority Data
Aug. 7, 2015 (GB) .................................... 1514006

(51) Int. Cl.
*G06Q 20/10* (2012.01)
*G06Q 20/32* (2012.01)
(Continued)

(52) U.S. Cl.
CPC ..... *G06Q 20/1085* (2013.01); *G06Q 20/3224* (2013.01); *G06Q 20/4014* (2013.01);
(Continued)

(58) Field of Classification Search
CPC ............... G06Q 20/1085; G06Q 20/32; G06Q 20/3224; G06Q 40/00; G06Q 40/02; G07F 19/20; G07F 19/203; G07F 19/211
See application file for complete search history.

(56) References Cited

U.S. PATENT DOCUMENTS 10,217,093 B2 * 2/2019 Trivedi .................. G06Q 20/40
10,354,246 B1 * 7/2019 Janiga ................... G07F 19/204
(Continued)

FOREIGN PATENT DOCUMENTS

GB         2380845 A       4/2003

OTHER PUBLICATIONS

Advanced Interactive Media Group LLC, http://www.safetradestations.com/ (Year: 2015).*
(Continued)

*Primary Examiner* — David P Sharvin
*Assistant Examiner* — Brock E Turk
(74) *Attorney, Agent, or Firm* — McDonnell Boehnen Hulbert & Berghoff LLP

(57) ABSTRACT

A withdrawer computing device may send to an application server device a cash withdrawal request for a cash withdrawal of an amount of physical cash. The withdrawer computing device may then receive from the application server device a quote of a cash withdrawal fee for the cash withdrawal, obtain an acceptance of the quote, and send a notification of the acceptance to the application server device. The withdrawer computing device may also receive an indication that the cash withdrawal has been completed, and transmit to the application server device confirmation that the cash withdrawal has been completed. A withdrawer electronic funds account may then be debited by the amount of physical cash and the cash withdrawal fee and a depositor
(Continued)

electronic funds account may then be credited by the amount of physical cash and the cash withdrawal fee.

22 Claims, 20 Drawing Sheets

(51) Int. Cl.
    *G06Q 20/40*     (2012.01)
    *G06Q 40/00*     (2023.01)
    *G06Q 40/02*     (2023.01)
    *G07F 19/00*     (2006.01)

(52) U.S. Cl.
    CPC .............. *G06Q 40/00* (2013.01); *G06Q 40/02* (2013.01); *G07F 19/20* (2013.01); *G07F 19/203* (2013.01); *G07F 19/211* (2013.01); *G06Q 20/326* (2020.05)

(56) References Cited

U.S. PATENT DOCUMENTS

| | | | | |
|---|---|---|---|---|
| 11,037,129 | B1* | 6/2021 | Chen | G06Q 20/3224 |
| 2003/0229548 | A1* | 12/2003 | Kakuta | G07F 7/1008 |
| | | | | 705/26.1 |
| 2008/0045234 | A1* | 2/2008 | Reed | H04W 8/02 |
| | | | | 455/456.1 |
| 2011/0066550 | A1* | 3/2011 | Shank | G06Q 20/327 |
| | | | | 705/43 |
| 2013/0151418 | A1* | 6/2013 | Licciardello | G06Q 20/02 |
| | | | | 705/72 |
| 2013/0332337 | A1* | 12/2013 | Tran | G06Q 40/03 |
| | | | | 705/38 |
| 2014/0129951 | A1* | 5/2014 | Amin | H04L 67/52 |
| | | | | 715/738 |
| 2014/0156512 | A1* | 6/2014 | Rahman | G06Q 20/326 |
| | | | | 705/39 |
| 2015/0120572 | A1* | 4/2015 | Slade | G06Q 20/3224 |
| | | | | 705/73 |
| 2015/0310470 | A1* | 10/2015 | Mathew | G06Q 20/10 |
| | | | | 705/38 |
| 2016/0078416 | A1* | 3/2016 | DeLuca | G06Q 20/1085 |
| | | | | 705/43 |
| 2016/0140521 | A1* | 5/2016 | Trivedi | G06Q 20/10 |
| | | | | 705/39 |
| 2016/0140555 | A1* | 5/2016 | Scipioni | G06Q 20/381 |
| | | | | 705/43 |

OTHER PUBLICATIONS

Nakamoto, Satoshi, and A. Bitcoin. "A peer-to-peer electronic cash system." Bitcoin.âURL: https://bitcoin. org/bitcoin. pdf 4.2 (2008): 15 (Year: 2008).*
UKIPO Communication for Application No. GB1514006.4, dated Feb. 2, 2017, 6 pages.
Examination Report for related Canadian Patent Application No. 2,994,896 dated Dec. 11, 2018, 4 pages.
Examination Report for related Australian Patent Application No. 2016305549 dated Feb. 12, 2019, 4 pages.
International Search Report and Written Opinion for International Application No. PCT/GB2016/052445 mailed Oct, 13, 2016.
Examination Report for related European Patent Application No. 16 751 328.2 dated Sep. 22, 2020, 6 pages.
Examination Report for related UK Patent Application No. GB1514006.4 dated May 20, 2021, 4 pages.
Australian Government, IP Australia; Examination report No. 2 for standard patent application No. 2016305549; Aug. 1, 2019.
Canadian Intellectual Property Office; Examination report and examination search report for Canadian patent application No. 2,994,896; Dec. 10, 2019.
Australian Government, IP Australia; Examination report No. 3 for standard patent application No. 2016305549; Feb. 7, 2020.
United Kingdom Intellectual Property Office; Examination report for United Kingdom patent application No. GB 1514006.4; Dec. 19, 2017.
United Kingdom Intellectual Property Office; Decision for United Kingdom patent application No. GB 1514006.4; Nov. 24, 2021.
United Kingdom Intellectual Property Office; Decision for United Kingdom patent application No. GB 1514006.4; Dec. 21, 2021.
The International Bureau of WIPO; International preliminary report on patentability for corresponding International application No. PCT/GB2016/052445; Feb. 13, 2018.
European Patent Office; Summons to attend oral proceedings for corresponding European patent application No. 16751328.2-1222; Jan. 3, 2022.

* cited by examiner

EXCHANGING PHYSICAL CASH WITH AN ELECTRONIC FUNDS ACCOUNT

CROSS-REFERENCE TO RELATED APPLICATIONS

The present application is a national phase of International Patent Application Pub. No. WO2017/025728, titled "Exchanging Physical Cash with an Electronic Funds Account" and filed on Aug. 5, 2016, the content of which is hereby incorporated by reference in its entirety.

International Patent Application Pub. No. WO2017/025728 claims priority from U.K. Patent Application No. 1514006.4 filed on Aug. 7, 2015, the content of which is hereby incorporated by reference in its entirety.

BACKGROUND

The recent widespread adoption of mobile smartphones has enabled the proliferation of payment services that can be performed from, or using, a mobile device. Such payment services can be performed with non-coin-based currency systems such as mobile money, usually in association with mobile wallet technology.

While mobile wallets provide a convenient way to make electronic payments, their use for deposits and withdrawals of cash are problematic. In order to deposit cash into or to withdraw cash from a mobile wallet, current technology involves the mobile wallet being integrated with existing non-mobile financial infrastructure, for example financial institutions and automated teller machines ("ATMs").

SUMMARY

Viewed from one aspect, the disclosure provides a method including: sending, by a withdrawer computing device to an application server device, a cash withdrawal request having an associated maximum broadcast radius, wherein the withdrawer computing device is associated with a withdrawer electronic funds account, and wherein the cash withdrawal request is for a cash withdrawal of an amount of physical cash; receiving, by the withdrawer computing device from the application server device, a quote of a cash withdrawal fee for the cash withdrawal, wherein the quote is provided by a depositor computing device located within the maximum broadcast radius, and wherein the depositor computing device is associated with a depositor electronic funds account; obtaining, by the withdrawer computing device, an acceptance of the quote; sending, by the withdrawer computing device to the application server device, a notification of the acceptance of the quote; receiving, by the withdrawer computing device, an indication that a party associated with the depositor computing device has provided the amount of physical cash to a party associated with the withdrawer computing device; and transmitting, by the withdrawer computing device to the application server device, confirmation that the cash withdrawal has been completed, wherein the withdrawer electronic funds account is debited by the amount of physical cash and the cash withdrawal fee and the depositor electronic funds account is credited by the amount of physical cash and the cash withdrawal fee at least partially in response to the confirmation that the cash withdrawal has been completed.

Viewed from a second aspect, the disclosure provides a method including: receiving, by a depositor computing device from an application server device, a cash withdrawal request, wherein the depositor computing device is associated with a depositor electronic funds account, wherein the cash withdrawal request is provided by a withdrawer computing device located within a maximum reception radius of the depositor computing device, wherein the withdrawer computing device is associated with a withdrawer electronic funds account, and wherein the cash withdrawal request is for a cash withdrawal of an amount of physical cash; obtaining, by the depositor computing device, an acceptance of the cash withdrawal request; sending, by the depositor computing device to the application server device, a quote of a cash withdrawal fee for the cash withdrawal; receiving, by the depositor computing device from the application server device, a notification of an acceptance of the quote; receiving, by the depositor computing device, an indication that a party associated with the depositor computing device has provided the amount of physical cash to a party associated with the withdrawer computing device; and transmitting, by the depositor computing device to the application server device, confirmation that the cash withdrawal has been completed, wherein the withdrawer electronic funds account is debited by the amount of physical cash and the cash withdrawal fee and the depositor electronic funds account is credited by the amount of physical cash and the cash withdrawal fee at least partially in response to the confirmation that the cash withdrawal has been completed.

Viewed from a third aspect, the disclosure provides a method including: receiving, by an application server device from a withdrawer computing device, a cash withdrawal request having an associated maximum broadcast radius, wherein the withdrawer computing device is associated with a withdrawer electronic funds account, and wherein the cash withdrawal request is for a cash withdrawal of an amount of physical cash; determining, by the application server device, a depositor computing device that is located within the maximum broadcast radius, wherein the depositor computing device is associated with a depositor electronic funds account; sending, by the application server device to the depositor computing device, the cash withdrawal request; receiving, by the application server device from the depositor computing device, a quote of a cash withdrawal fee for the cash withdrawal; sending, by the application server device to the withdrawer computing device, the quote; receiving, by the application server device from the withdrawer computing device, an acceptance of the quote; sending, by the application server device to the depositor computing device, a notification of the acceptance of the quote; receiving, by the application server device from the withdrawer computing device, a first confirmation that a party associated with the depositor computing device has provided the amount of physical cash to a party associated with the withdrawer computing device; receiving, by the application server device from the depositor computing device, a second confirmation that a party associated with the depositor computing device has provided the amount of physical cash to a party associated with the withdrawer computing device; debiting, by the application server device, the withdrawer electronic funds account by the amount of physical cash and the cash withdrawal fee; and crediting, by the application server device, the depositor electronic funds account by the amount of physical cash and the cash withdrawal fee.

Viewed from a fourth aspect, the disclosure provides a method including: sending, by a depositor computing device to an application server device, a cash deposit request having an associated maximum broadcast radius, wherein the depositor computing device is associated with a depositor electronic funds account, and wherein the cash deposit request is for a cash deposit of an amount of physical cash;

receiving, by the depositor computing device from the application server device, a quote of a cash deposit fee for the cash deposit, wherein the quote is provided by a receiver computing device located within the maximum broadcast radius, and wherein the receiver computing device is associated with a receiver electronic funds account; obtaining, by the depositor computing device, an acceptance of the quote; sending, by the depositor computing device to the application server device, a notification of the acceptance of the quote; receiving, by the depositor computing device, an indication that a party associated with the depositor computing device has provided the amount of physical cash to a party associated with the receiver computing device; and transmitting, by the depositor computing device to the application server device, confirmation that the cash deposit has been completed, wherein the receiver electronic funds account is debited by an amount equal to the amount of physical cash less the cash deposit fee and the depositor electronic funds account is credited by the amount equal to the amount of physical cash less the cash deposit fee at least partially in response to the confirmation that the cash deposit has been completed.

Viewed from a fifth aspect, the disclosure provides a method including: receiving, by a receiver computing device from an application server device, a cash deposit request, wherein the receiver computing device is associated with a receiver electronic funds account, wherein the cash deposit request is provided by a depositor computing device located within a maximum reception radius of the receiver computing device, wherein the depositor computing device is associated with a depositor electronic funds account, and wherein the cash deposit request is for a cash deposit of an amount of physical cash; obtaining, by the receiver computing device, an acceptance of the cash deposit request; sending, by the receiver computing device to the application server device, a quote of a cash deposit fee for the cash deposit; receiving, by the receiver computing device from the application server device, a notification of an acceptance of the quote; receiving, by the receiver computing device, an indication that a party associated with the depositor computing device has provided the amount of physical cash to a party associated with the receiver computing device; and transmitting, by the receiver computing device to the application server device, confirmation that the cash deposit has been completed, wherein the receiver electronic funds account is debited by an amount equal to the amount of physical cash less the cash deposit fee and the depositor electronic funds account is credited by the amount equal to the amount of physical cash less the cash deposit fee at least partially in response to the confirmation that the cash deposit has been completed.

Viewed from a sixth aspect, the disclosure provides a method including: receiving, by an application server device from a depositor computing device, a cash deposit request having an associated maximum broadcast radius, wherein the depositor computing device is associated with a depositor electronic funds account, and wherein the cash deposit request is for a cash deposit of an amount of physical cash; determining, by the application server device, a receiver computing device that is located within the maximum broadcast radius, wherein the receiver computing device is associated with a receiver electronic funds account; sending, by the application server device to the receiver computing device, the cash deposit request; receiving, by the application server device from the receiver computing device, a quote of a cash deposit fee for the cash deposit; sending, by the application server device to the depositor computing device, the quote; receiving, by the application server device from the depositor computing device, an acceptance of the quote; sending, by the application server device to the receiver computing device, a notification of the acceptance of the quote; receiving, by the application server device from the depositor computing device, a first confirmation that a party associated with the depositor computing device has provided the amount of physical cash to a party associated with the receiver computing device; receiving, by the application server device from the receiver computing device, a second confirmation that a party associated with the depositor computing device has provided the amount of physical cash to a party associated with the receiver computing device; debiting, by the application server device, the receiver electronic funds account by the amount of physical cash less the cash deposit fee; and crediting, by the application server device, the depositor electronic funds account by the amount of physical cash less the cash deposit fee.

In a seventh aspect, an article of manufacture may include a non-transitory computer-readable medium, having stored thereon program instructions, that upon execution by a computing device, cause the computing device to perform the operations of any of the first, second, third, fourth, fifth, or sixth aspects.

In an eighth aspect, a computing device may include at least one processor, and a memory having stored thereon program instructions executable by the at least one processor to perform the operations of any of the first, second, third, fourth, fifth, or sixth aspects.

In a ninth aspect, a system may include various means for carrying out the operations of any of the first, second, third, fourth, fifth, or sixth aspects.

In embodiments of the disclosure in which a computer software product is used, the product may be non-transitory and store instructions on physical media such as a DVD, or a solid state drive, or a hard drive. Alternatively, the product may be transitory and in the form of instructions provided over a connection such as a network connection which is linked to a network such as the Internet.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

I. Introduction

Figure 1:
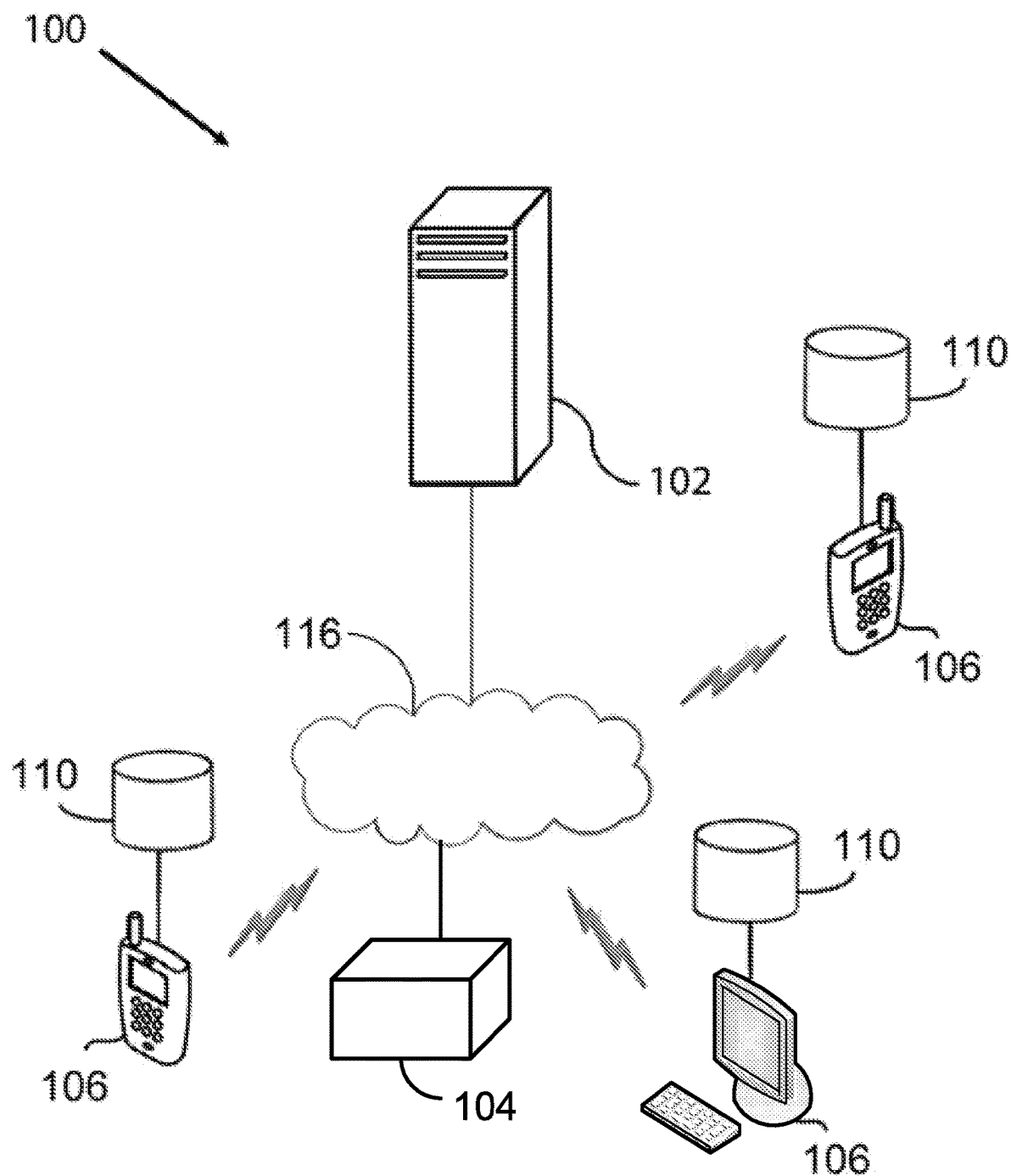
FIG. 1 is a schematic representation of a system for transferring money, in accordance with example embodiments.

This description describes, among other things, several example embodiments including, but not limited to, example embodiments pertaining to withdrawing physical cash from an electronic funds account and depositing physical cash to an electronic funds account.

By way of example, a withdrawer computing device can send a cash withdrawal request having an associated maximum broadcast radius to an application server device. The cash withdrawal request may be a request to withdraw an amount of physical cash from an electronic funds account. The application server device may then provide the withdrawer computing device with a quote of a cash withdrawal fee for the cash withdrawal. The quote may be provided by a depositor computing device that is located within the maximum broadcast radius. If a party associated with the withdrawer computing device accepts the quote, the application server device may provide, to the withdrawer computing device, identification information for a party associated with the depositor computing device. Likewise, the application server device may provide to the depositor computing device identification information for the party associated with the withdrawer computing device.

The party associated with withdrawer computing device and the party associated with the depositor computing device may then arrange a time and place to meet, so that the party associated with the depositor computing device can provide the requested amount of physical cash to the party associated with the withdrawer computing device. After the parties notify, by way of their respective computing devices, the application server device that the physical cash has been exchanged, the application server device may debit an electronic funds account associated with the withdrawer computing device by the amount of physical cash and the cash withdrawal fee. Further, the application server device may also credit an electronic funds account associated with the depositor computing device by the amount of physical cash and the cash withdrawal fee. Thus, the party associated with the withdrawer computing device can withdraw physical cash from an electronic funds account without having to visit a brick-and-mortar business (e.g., a bank) or an ATM.

As another example, a depositor computing device can send a cash deposit request having an associated maximum broadcast radius to an application server device. The cash deposit request may be a request to deposit an amount of physical cash to an electronic funds account. The application server device may then provide the depositor computing device with a quote of a cash deposit fee for the cash deposit. The quote may be provided by a receiver computing device that is located within the maximum broadcast radius. If a party associated with the depositor computing device accepts the quote, the application server may provide, to the depositor computing device, identification information for a party associated with the receiver computing device. Likewise, the application server device may provide to the receiver computing device identification information for the party associated with the depositor computing device.

The party associated with the depositor computing device and the party associated with the receiver computing device may then arrange a time and place to meet, so that the party associated with the depositor computing device can provide the requested amount of physical cash to the party associated with the receiver computing device. After the parties notify, by way of their respective computing devices, the application server device that the physical cash has been exchanged, the application server device may debit an electronic funds account associated with the receiver computing device by an amount equal to the amount of physical cash less the cash deposit fee. Further, the application server device may also credit an electronic funds account associated with the depositor computing device by the amount equal to the amount of physical cash less the cash deposit fee. Thus, the party associated with the depositor computing device can deposit physical cash to an electronic funds account without having to visit a brick-and-mortar business (e.g., a bank) or an ATM.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

II. Example Architecture

FIG. 1 depicts a schematic representation of an example system 100 in accordance with example embodiments described herein. The system 100 includes an application server 102, a point of sale ("POS") terminal 104, one or more computing devices 106, one or more user profiles 110, and a communications network 116.

The one or more computing devices 106 can take the form of a mobile wireless computing device. For example, any of the one or more computing devices 106 can take the form of a conventional smartphone handset provisioned with a web browser and a wireless connection to the Internet. A mobile wireless computing device can be referred to as a "mobile smartphone handset" or, more simply, a "mobile smartphone" or "smartphone." One example of a mobile smartphone is a personal digital assistant or a cellular telephone. Another example of a mobile smartphone is an iPhone®, such as the iPhone6, or an iPad® sold by Apple Inc., of Cupertino, California, United States. The one or more computing devices 106 can also take the form of a laptop computing device or desktop computing device.

To help illustrate features of the present disclosure, portions of this document will focus on mobile smartphones by way of example. Those of ordinary skill in the art will readily appreciate, however, that the disclosed principles can be applied as well using other types of computing devices, with variations where appropriate. Furthermore, portions of this document will focus on mobile wallets by way of example. Those of ordinary skill in the art will readily appreciate, however, that the disclosed principles can be applied as well using other types of electronic funds accounts.

The one or more computing devices 106 can communicate with the application server 102 and/or the POS terminal 104 using the communication network 116. The communication network 116 can comprise a wide-area network, such as the Internet. Additionally, in some instances, the one or more mobile smartphones can communicate directly with the POS terminal 104 using a wireless communication link (not shown).

Communication between the application server 102 and one of the computing devices can be facilitated by using a server-hosted program (not shown), such as a banking application program ("banking app") that is installed and executed on one of the computing devices or accessed using a web browser on one of the computing devices. In another respect, communication between the application server 102 and one of the computing devices can occur using a pair of network interfaces (such as the network interface 152 shown in FIG. 2 and the network interface 184 shown in FIG. 3).

In one example, a user can download a copy of the banking app from a download repository (for example, data storage device 194 in FIG. 3) and install the banking app on a computing device. On, during, or after installation, the banking app may create a user profile 110 on the computing device and may prompt the user to manually provide personal attributes such as the user's first name, the user's last name, an e-mail address, a physical address and particulars of a payment instrument in the form of an electronic wallet ("e-wallet"). If the user is unable to provide particulars of a payment instrument in the form of an e-wallet, the banking app on the computing device may cause the application server 102 to create an e-wallet for the user.

The banking app may also prompt the user to submit an image of the user, which the user can provide by taking a self-portrait with a camera on the computing device, for instance, or alternatively, by selecting an image stored on the computing device or the Internet. The user image may then be stored in the user profile 110 and the data in the user profile may be passed to the application server 102.

In one embodiment, the user profile 110 can be replicated and stored on the application server 102. With such an arrangement, a banking app on the computing device may synchronize changes to the user profile 110 with a copy of the user profile that is stored on the application server, either as the changes occur, periodically, or explicitly under user command. The copy of the user profile on the application server can then be imported to a different computing device when, for example, a user changes computing devices or in the event the user loses or damages their computing device. Further, in some embodiments, in order to improve security of the system 100, transmission of data from the user profile 110 to the application server 102 by the banking app may be encrypted. Alternatively, in accordance with at least some example embodiments, the user profile 110 (for example, the data in the user profile 110) is stored locally on the computing device 106 and is not passed to the application server 102.

In another example, the banking app may be a web application that the user may access using a web browser rather than by downloading a copy of the banking app.

Figure 2:
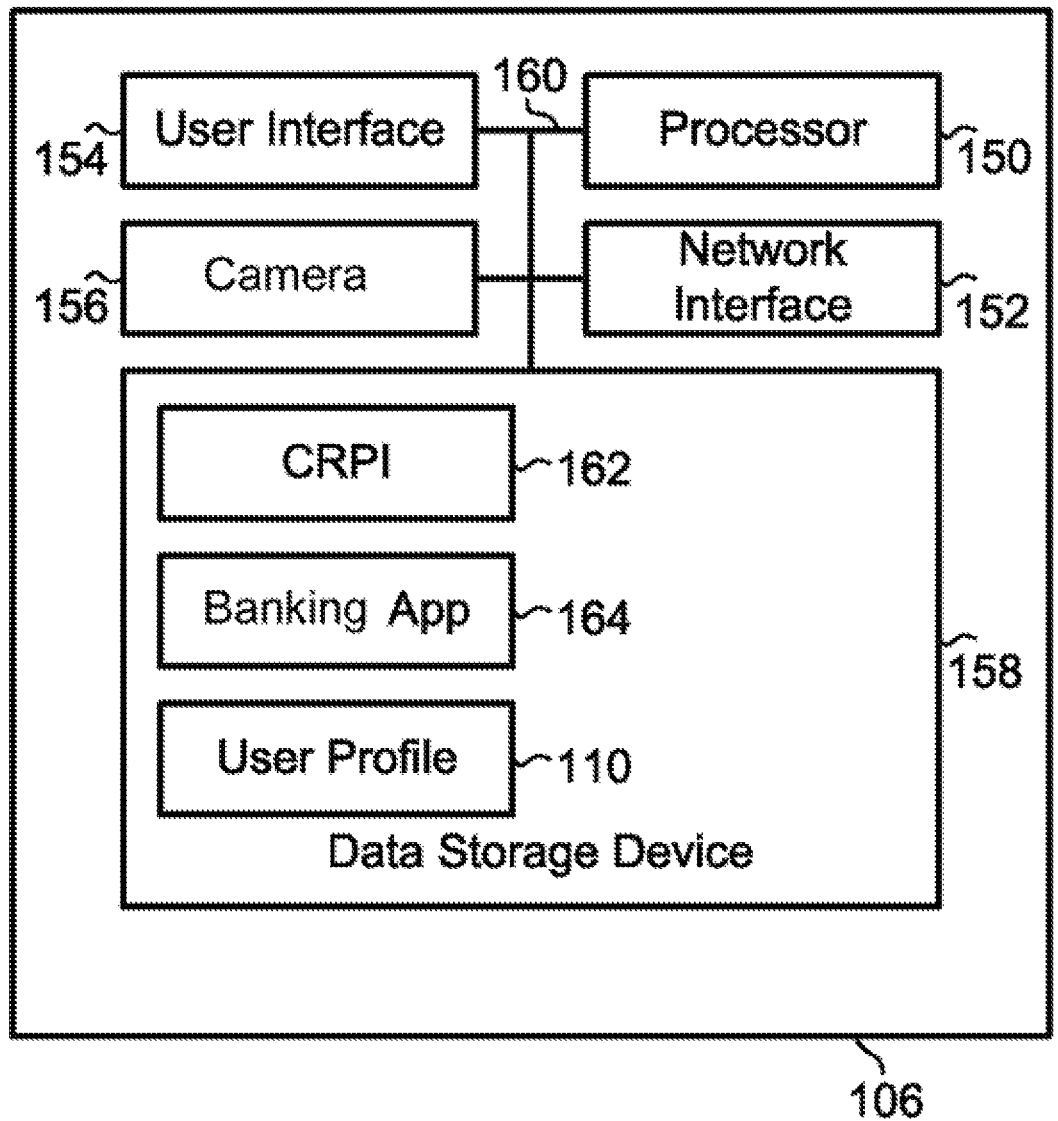
FIG. 2 is a simplified block diagram of an example computing device, in accordance with example embodiments.

Next, FIG. 2 is a block diagram depicting an example embodiment of one of the computing devices 106. In line with the discussion above, computing device 106 may take any of a variety of forms, including, for example, a mobile phone, a tablet device, a wearable computing device, a laptop computing device, a desktop computing device, or some other type of computing device. As shown in FIG. 2, computing device 106 may include a processor 150, a network interface 152, a user interface 154, a camera 156, and a data storage device 158, all of which may be coupled together by a system bus, network, or other connection mechanism 160.

The processor 150 can include a general-purpose processor (e.g., a microprocessor) or a special-purpose processor (e.g., a digital signal processor an application specific integrated circuit).

The network interface 152 may include a wired or wireless communication interface. For purposes of this description, any data described as being sent or transmitted by computing device 106 can be data sent by network interface 152 over a communication network. For instance, computing device 106 can use network interface 152 to transmit data to and receive data from communication network 116 of FIG. 1.

The user interface 154 may facilitate interaction with a user. As such, the user interface 154 may take the form of a graphical user interface (GUI) and may include output components such as a speaker and a display as well as input components such as a keypad, touch-sensitive screen, or microphone.

A user may use the camera 156 to take a self-portrait. The self-portrait may be stored as a profile picture in data storage device 158. Further, the self-portrait may be provided to the application server 102.

Data storage device 158 may include volatile or non-volatile storage components and may be integrated in whole or in part with processor 150. Data storage device 158 may take the form of a non-transitory computer-readable medium and may include computer-readable program instructions ("CRPI") 162, that when executed by processor 150, cause computing device 106 to perform one or more of the operations described herein. Any software program instructions discussed in this description or shown in the drawings can be referred to as CRPI, or more simply, program instructions. In one example, the CRPI 162 may include instructions for executing a banking app 164. Further, data storage device 158 may also store user profile 110.

The computing device 106 may also include location services configured to determine a location of the computing device 106. By way of example, the computing device 106 may include a global positioning system ("GPS") receiver. As another example, the computing device 106 may include a cellular-based location service that is configured to determine a location of the computing device via triangulation. As still another example, the computing device 106 may include a Wi-Fi-based location service that is configured to determine a location of the computing device 106 based on known locations of Wi-Fi access points and received signal strengths of Wi-Fi signals.

In some embodiments, the computing device 106 may transmit a location of the computing device to the application server 102 periodically. Alternatively, the computing device may transmit a location of the computing device to the application server 102 on-demand in response to a request received from the application server 102.

Figure 3:
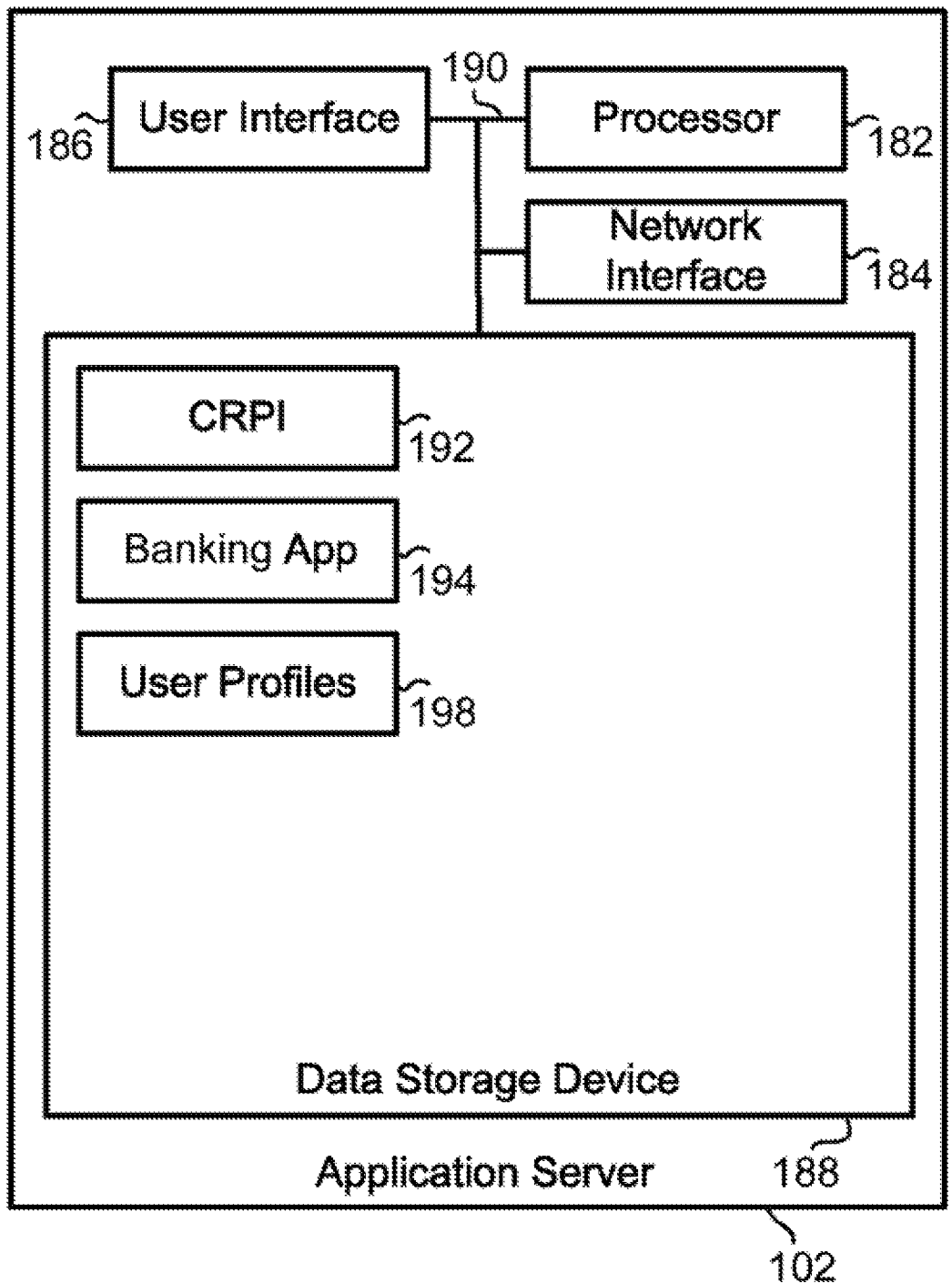
FIG. 3 is a simplified block diagram of an example application server device, in accordance with example embodiments.

Next, FIG. 3 is a block diagram depicting an example embodiment of application server 102. As shown in FIG. 3, application server 102 may include a processor 182, a network interface 184, a user interface 186, and a data storage device 188, all of which may be coupled together by a system bus, network, or other connection mechanism 190.

The processor 182 can include a general-purpose processor (e.g., a microprocessor) or a special-purpose processor (e.g., a digital signal processor an application specific integrated circuit).

The network interface 184 may include a wired or wireless communication interface. For purposes of this description, any data described as being sent or transmitted by application server 102 can be data sent by network interface 184 over a communication network. For instance, application server 102 can use network interface 184 to transmit data to and receive data from communication network 116 of FIG. 1.

Data storage device 188 may include volatile or non-volatile storage components and may be integrated in whole or in part with processor 182. Data storage device 188 may take the form of a non-transitory computer-readable medium and may include CRPI 192, that when executed by processor 182, cause application server 102 to perform one or more of the operations described herein. In one example, the CRPI 192 may include instructions for executing a banking app 194. Further, data storage device 188 may also store a plurality of user profiles 198.

III. Example Operation—General

The system 100 may be employed by a first registered user to withdraw cash from the first user's electronic funds account and to deposit cash into the first user's electronic funds account by means of peer-to-peer cash exchange with a second registered user of the system. As discussed above, although the term "mobile smartphone" is used, those of ordinary skill in the art will readily appreciate, however, that the disclosed operations could be performed as well using other types of computing devices, with variations where appropriate.

Figure 4:
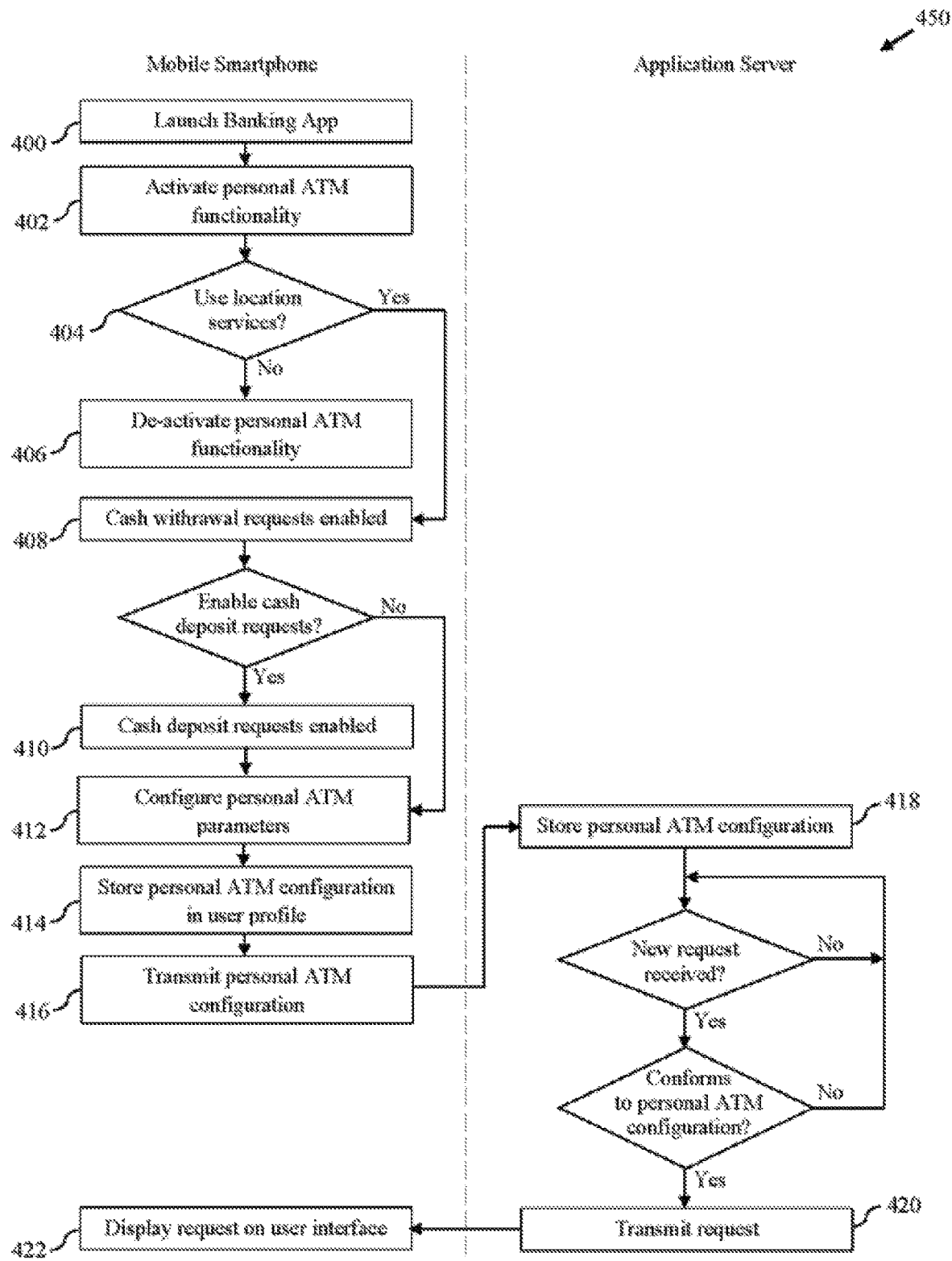
FIG. 4 is a flow chart, in accordance with example embodiments.

FIG. 4 is a flow chart depicting a set of functions 450 that can be carried out in accordance with an example embodiment. In particular, FIG. 4 depicts a set of functions 450 that can be performed by a user of the system 100 to configure the personal ATM functionality of the banking app 164 on the user's mobile smartphone. The set of functions 450 is shown within blocks 400 through 422. A description of those blocks now follows.

At block 400, the user may launch the banking app 164 on the user's mobile smartphone. As discussed above, the banking app 164 may be downloaded from a download repository or may be a web application.

At block 402, the user may activate the personal ATM functionality of the banking app 164. For example, the user may activate the personal ATM functionality using an activation icon displayed by the banking app on the user interface 154 of the mobile smartphone.

At block 404, the banking app 164 may request the user's permission to use location services (for example, GPS location) on the user's mobile smartphone. If the user declines such permission, the banking app may de-activate the personal ATM functionality of the banking app 164 (block 406). If the user permits the use of location services, the personal ATM functionality of the banking app 164 on the user's mobile smartphone may be automatically configured, at block 408, to accept cash withdrawal requests from other users of the system 100. Such a cash withdrawal request may originate from another user (i.e. an issuer of the request) who requires cash in exchange for funds deposited into the mobile wallet of the receiver of the cash withdrawal request. The user may, at block 410, further configure the banking app 164 to also receive cash deposit requests from other users of the system 100. Such a cash deposit request may originate from another user who offers cash in exchange for funds deposited into the mobile wallet of the issuer of the cash deposit request.

Next, at block 412, the user may configure further parameters of the personal ATM functionality of the banking application 164 regarding incoming cash withdrawal and cash deposit requests. The further parameters may include: (i) a maximum reception radius of a cash withdrawal or a cash deposit request; (ii) a minimum amount of a cash withdrawal or a cash withdrawal request; and (iii) a maximum amount of a cash withdrawal or a cash deposit request.

At block 414, the banking app 164 on the user's mobile smartphone may store the user's personal ATM configuration parameters in the user's profile 110 (at block 414). Next, at block 416, the banking app 164 may transmit the user's personal ATM configuration parameters to the application server 102. The application server may then, at block 418, store the user's personal ATM configuration parameters in the user's profile 198 on the application server.

At block 420, the application server may receive a cash withdrawal or a cash deposit request. If the cash withdrawal or cash request conforms with the user's personal ATM configuration settings as stored in the user's profile 198 on the application server 102, the application server may, at block 422, forward the cash withdrawal or cash deposit request to the user's mobile smartphone for display by the banking app 164 on the user interface 154 of the mobile smartphone.

IV. Example Operation—Issuing a Cash Withdrawal Request

The following example describes an application of the system 100 by a user (referred to as a "withdrawer") to issue a cash withdrawal request to another user of the system (referred to as a "depositor").

The withdrawer and the depositor may have already set up their respective user profiles 110 on their mobile smartphones using the banking app.

Figure 5:
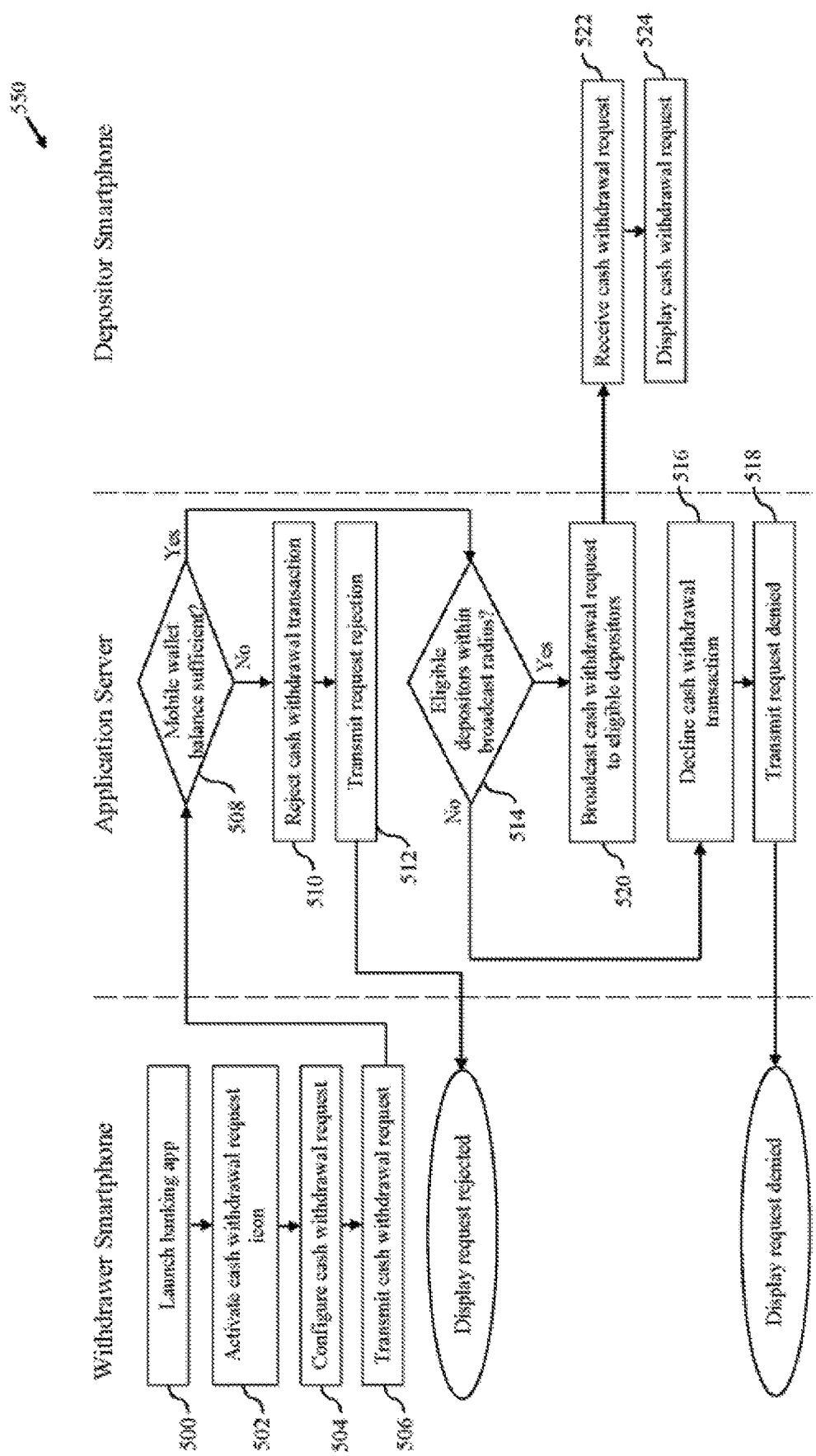
FIG. 5 is another flow chart, in accordance with example embodiments.

FIG. 5 is a flow chart depicting a set of functions 550 that can be carried out in accordance with an example embodiment. The set of functions 550 can be used to withdraw cash from the withdrawer's mobile wallet. The set of functions 550 is shown within blocks 500 through 524. A description of these blocks now follows.

At block 500, the withdrawer may launch the banking app 164 on the withdrawer's mobile smartphone. At block 502, the withdrawer may activate a new cash withdrawal request by, for example, using an activation icon displayed by the banking app on the user interface 154 of the mobile smartphone. The withdrawer may then configure, at block 504, details of the cash withdrawal request. In one example, the details may include: a withdrawal amount; an expiry date and time of the cash withdrawal request; a date and time by which the cash withdrawal is required; and a maximum broadcast radius of the cash withdrawal request. In one embodiment, the maximum broadcast radius may be the maximum physical distance between the withdrawer and any depositors who may receive the broadcast message.

Next, at block 506, the banking app 164 on the withdrawer's mobile smartphone may transmit the withdrawer's cash withdrawal request details to the application server 102. In one example, the withdrawer's mobile smartphone may transmit a location of the withdrawer's mobile smartphone to the application server with the cash withdrawal request details.

The application server, at block 508, may determine whether the balance of funds in the withdrawer's mobile wallet is sufficient to cover the required cash withdrawal amount. If the withdrawer's mobile wallet balance is less than the requested withdrawal amount, the application server 102 may decline the withdrawer's cash withdrawal request at block 510 and notify the banking app 164 on the withdrawer's mobile smartphone (at block 512).

If the balance of funds in the withdrawer's mobile wallet is sufficient to cover the required cash withdrawal amount, at block 514, the application server 102 may determine whether there are any other users of the system 100 that are "eligible depositors." For example, the application server 102 may determine whether there are other users that: have activated and configured the personal ATM functionality of the banking app 164 on their respective mobile smartphones to receive cash withdrawal requests; are located within the maximum broadcast radius specified in the withdrawer's cash withdrawal request; and for whom the withdrawer is located within their maximum reception radius for cash withdrawal requests.

If there are not any eligible depositors, the application server 102 may decline the withdrawer's cash withdrawal request at block 516 and notify, at block 518, the banking app 164 on the withdrawer's mobile smartphone.

If there are one or more eligible depositors, at block 520, the application server 102 may broadcast the withdrawer's cash withdrawal request to all eligible depositors.

At block 522, an eligible depositor's mobile smartphone may receive the withdrawer's cash withdrawal request from the application server 102. Next, at block 524, the banking app 164 on the depositor's mobile smartphone may display the received cash withdrawal request on the user interface 154 of the mobile smartphone.

Notably, the operation of determining whether there are any eligible depositors (e.g., the operation at block 514) necessitates computer implementation, especially when the withdrawer is beyond visible range and auditory range of one or more other users of the system 100. Without the intervention of an application server, it would be difficult for the withdrawer to ascertain the location of another user, let alone to ascertain whether the other user is willing and able to participate in a cash exchange, when the withdrawer is beyond visible range and auditory range of the other user. In contrast, the computer implementation herein allows the application server to determine eligible depositors, since the application server has access to the locations of the withdrawer and the other users as well as the personal ATM parameters for the other users. Consequently, this feature of the disclosure herein would not exist but for computer technology.

V. Example Operation—Accepting a Cash Withdrawal Request

The following example describes an application of the system 100 by a user (referred to as a "depositor") to respond to a cash withdrawal request received from another user of the system (referred to as a "withdrawer").

Figure 6:
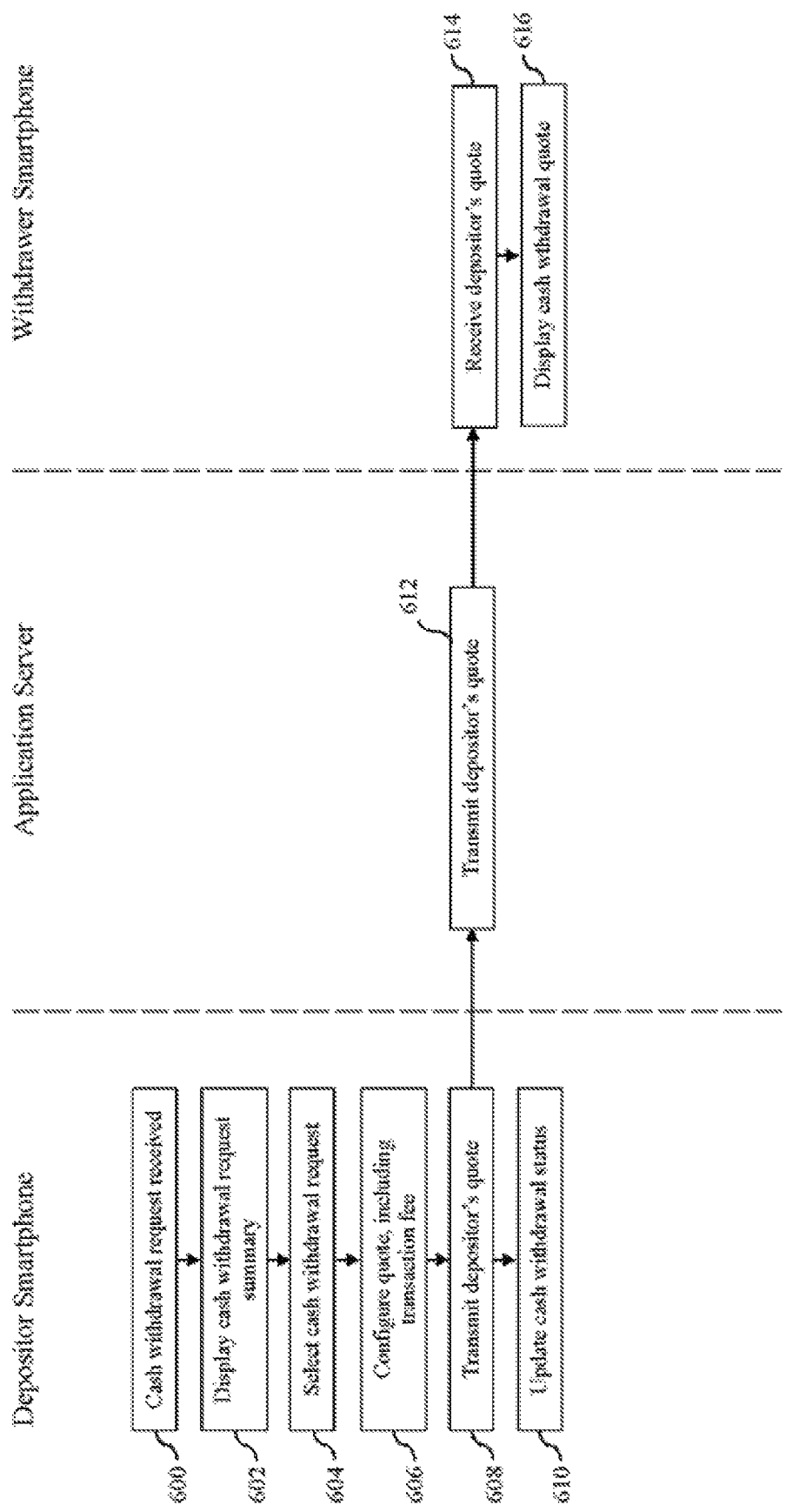
FIG. 6 is yet another flow chart, in accordance with example embodiments.

FIG. 6 is a flow chart depicting a set of functions 650 that can be carried out in accordance with an example embodiment. The set of functions 650 can be used to respond to a cash withdrawal request by providing an offer to participate in a peer-to-peer exchange of cash. The set of functions 650 is shown within blocks 600 through 616. A description of those blocks now follows.

At block 600, the banking app 164 on the depositor's mobile smartphone may notify the depositor that one or more cash withdrawal requests have been received from the application server 102. The depositor may cause the banking app 164 to display, at block 602, a summary of all outstanding cash withdrawal requests received from the application server 102. In one example, the cash withdrawal summary may include, for each outstanding cash withdrawal request, an indication of the withdrawer's identity, a requested withdrawal amount, a distance to the withdrawer, and a countdown timer displaying a time remaining until expiry of the withdrawer's cash withdrawal request.

Next, at block 604, the depositor may select one of the outstanding cash withdrawal requests in the summary in order to analyze further particulars of the selected request. The further particulars may include a time by which the withdrawer requires the requested amount of cash, and a rating associated with the withdrawer.

Next, at block 606, the depositor may configure, using the banking app 164, an offer in response to the selected cash withdrawal request (referred to as a "quote"). In one embodiment, the quote may include a transaction fee requested by the depositor to participate in a peer-to-peer exchange of cash with the withdrawer. In one embodiment, the transaction fee may be a function of the withdrawer's rating. In one embodiment, the application server 102 may determine an average transaction fee based on past completed cash withdrawal transactions and transmit this to the banking app 164 on the depositor's mobile smartphone for consideration by the depositor when configuring the quote in response to the selected cash withdrawal request.

The banking app 164 on the depositor's mobile smartphone may then, at block 608, transmit the depositor's quote for the selected cash withdrawal request to the application server 102. Next, at block 610, the banking app may update the status of the selected cash withdrawal request to indicate that the depositor has submitted a quote indicating a required transaction fee.

Next, at block 612, the application server 102 may transmit the quote received from the depositor to the mobile smartphone of the withdrawer who issued the cash withdrawal request to which the quote relates. At block 614, the withdrawer's mobile smartphone may receive the depositor's quote from the application server 102. Next, at block 616, the banking app 164 on the withdrawer's mobile smartphone may display the received cash withdrawal quote on the user interface 154 of the mobile smartphone.

VI. Example Operation—Accepting a Cash Withdrawal Quote

The following example describes an application of the system 100 by a user (referred to as a "withdrawer") to accept a quote from another user of the system (referred to as a "depositor") in response to a cash withdrawal request from the withdrawer.

Figure 7:
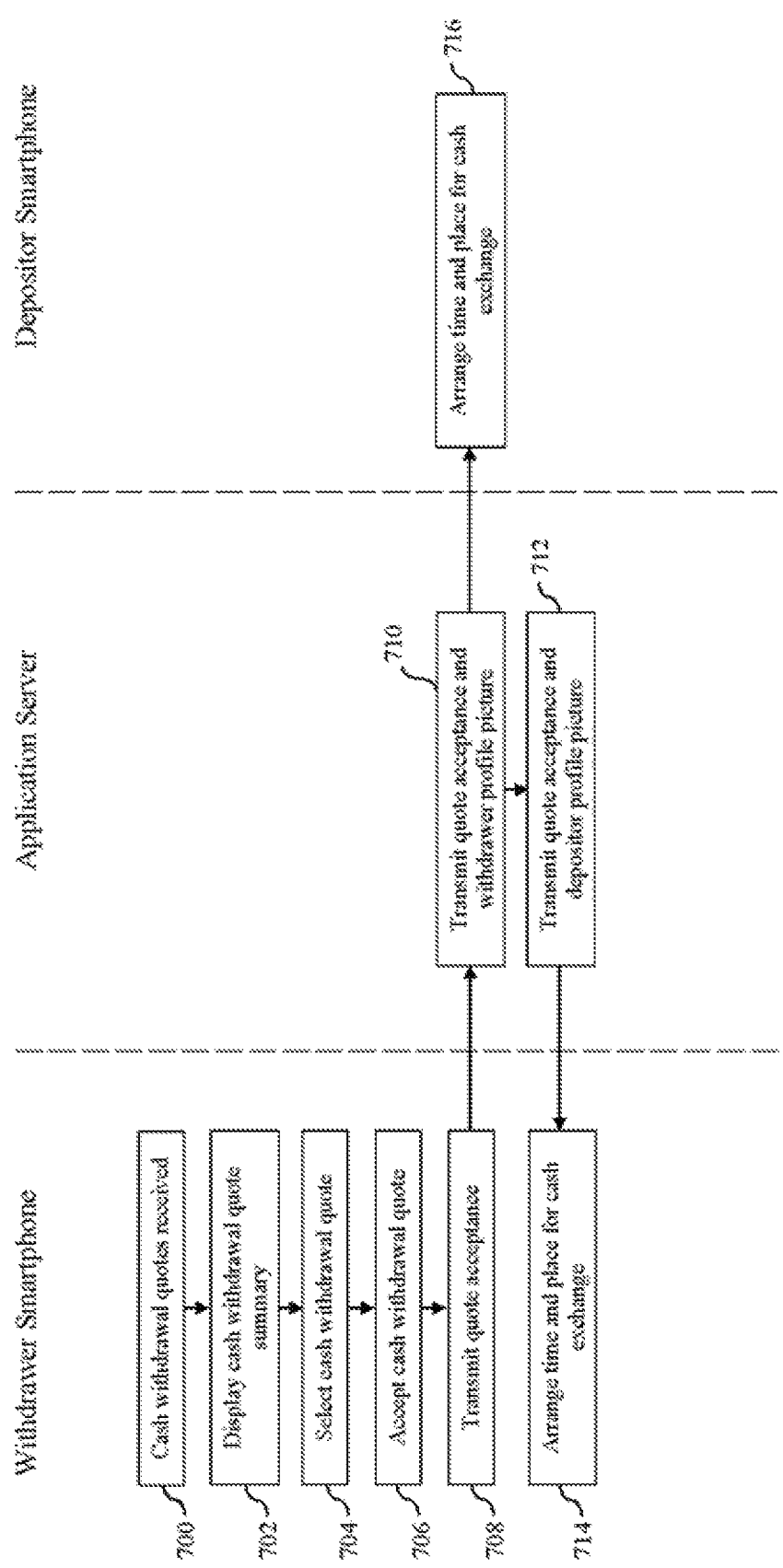
FIG. 7 is yet another flow chart, in accordance with example embodiments.

FIG. 7 is a flow chart depicting a set of functions 750 that can be carried out in accordance with an example embodiment. The set of functions 750 can be used to accept a quote for a peer-to-peer cash exchange associated with a cash withdrawal request. The set of functions 750 is shown in blocks 700 through 716. A description of those blocks now follows.

At block 700, the banking app 164 on the withdrawer's mobile smartphone may notify the withdrawer that one or more quotes have been received from the application server 102 in response to the withdrawer's cash withdrawal request. The withdrawer may, at block 702, cause the banking app 164 to display a summary of all cash withdrawal quotes received from the application server 102. In one example, the cash withdrawal quote summary may include, for each quote, an indication of the quoting withdrawer's identity, the withdrawal amount to which the quote relates, a distance to the depositor, an elapsed time since the application server 102 received the cash withdrawal quote, and the transaction fee requested by the quoting depositor for participating in a peer-to-peer cash exchange of cash with the withdrawer.

Next, at block 704, the withdrawer may select one of the received cash withdrawal quotes in order to analyze further particulars of the quote. The further particulars may include a rating associated with the quoting depositor.

Next, at block 706, the withdrawer may accept the selected cash withdrawal quote. At block 708, the banking app 164 may transmit the withdrawer's acceptance of the depositor's quote to the application server 102. At block 710 the application server may transmit the withdrawer's acceptance of the depositor's quote to the depositor together with the withdrawer's profile picture from the withdrawer's user profile 110 on the application server. At block 712, the application server 102 may transmit confirmation of the withdrawer's acceptance of the quote to the banking app 164 on the withdrawer's mobile smartphone, together with a profile picture of the depositor from the depositor's user profile 110 on the application server.

Next, at blocks 714 and 716, the withdrawer and the depositor who submitted the selected quote may arrange a time and a place to meet in order to conduct the peer-to-peer cash exchange. In one embodiment, the meeting between the withdrawer and the selected depositor may be arranged using a social media application such as Instagram or Facebook, for example. In another embodiment, the meeting may be arranged using a messaging facility included within the banking app 164. In still another embodiment, the meeting may be arranged using text messaging. In still another embodiment, the application server may provide the locations of the withdrawer and the depositor to the depositor and withdrawer, respectively, and so that the mobile smartphones of both parties can display a map that indicates the locations of both of the parties. In a further embodiment, the map may also indicate one or more suggested safe locations to perform the cash exchange, such as near a local police department or government facility.

Notably, the features of the application server transmitting the withdrawer's profile picture to the depositor and the application server transmitting the depositor's profile picture to the withdrawer necessitate computer implementation. Without computer implementation, it would be difficult for the withdrawer to determine what the depositor looks like before the parties meet face-to-face. In contrast, the computer implementation herein allows the parties to know what the other party looks like before meeting face-to-face. In some examples, by having a profile picture of the other party, the parties may be able to locate one another and/or confirm the other party's identity. Consequently, these feature of the disclosure herein would not exist but for computer technology.

VII. Example Operation—Cash Withdrawal Exchange and Confirmation

The following example describes an application of the system 100 to complete a cash withdrawal transaction between two users of the system (referred to as a "withdrawer" and a "depositor", respectively and, collectively, as the "parties").

Figure 8:
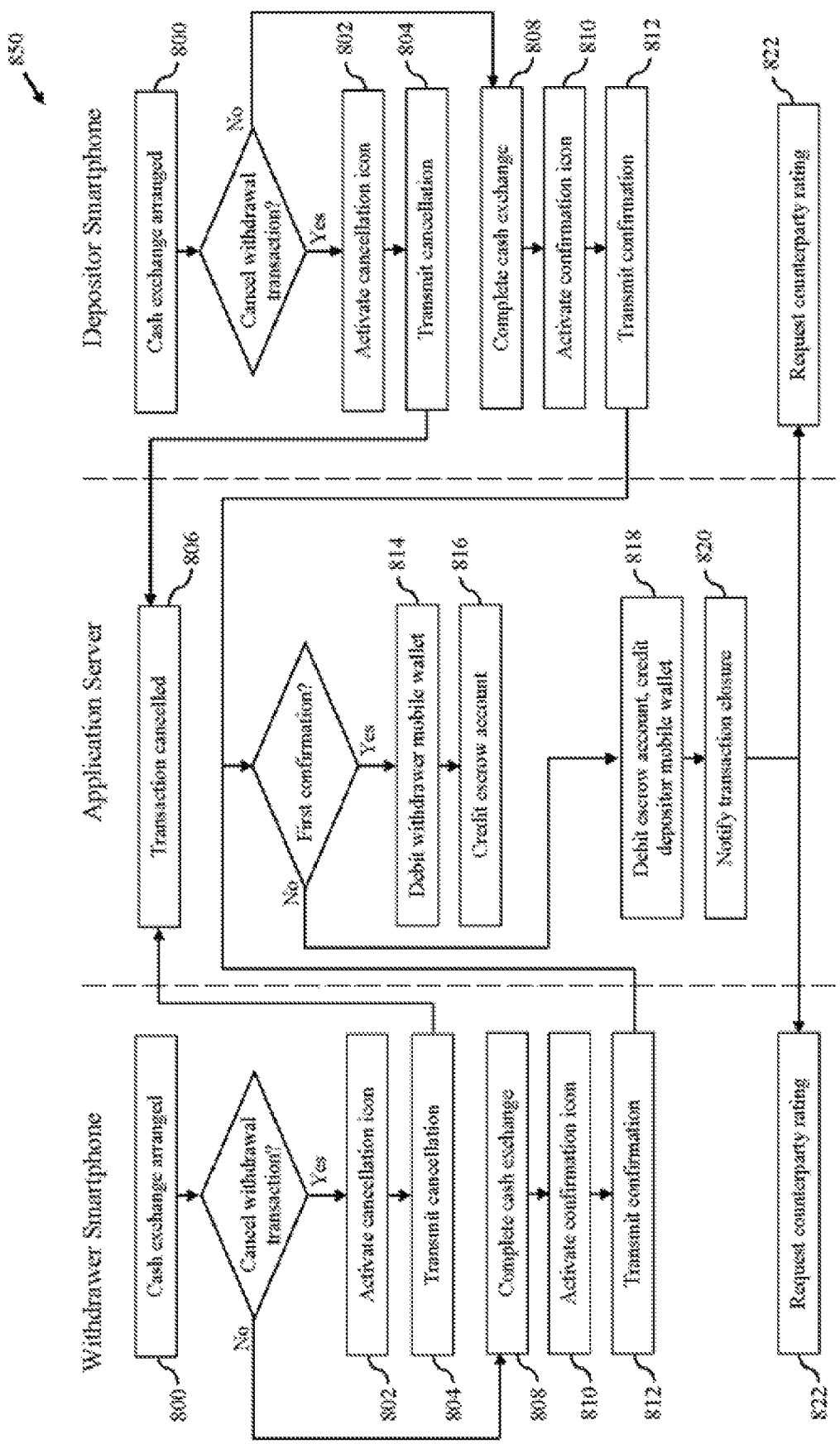
FIG. 8 is yet another flow chart, in accordance with example embodiments.

FIG. 8 is a flow chart depicting a set of functions 850 that can be carried out in accordance with an example embodiment. The set of functions 850 can be used to complete or, alternatively, to cancel a peer-to-peer cash exchange as part of a cash withdrawal transaction. The set of functions 850 is shown within blocks 800 through 822. A description of those blocks now follows.

At block 800, a withdrawer and a depositor may have arranged to meet at an agreed time and place in order to complete a cash withdrawal transaction in which the depositor has agreed to provide a predetermined sum of cash to the withdrawer.

Either one of the parties may cancel the agreed cash withdrawal transaction if so desired by activating, at block 802, a cancellation icon displayed by the banking app 164 on the user interface 154 of their respective mobile smartphones. Next, at block 804, the banking app 164 of the cancelling party may notify the application server 102 of the cancellation and, at block 806, the application server may notify the banking app 164 on the mobile smartphone of the other party of the cancellation.

If neither party cancels the transaction, the depositor may provide to the withdrawer the sum of cash specified in the withdrawer's cash withdrawal request (block 808). Next, at block 810, a first one of the withdrawer and the depositor may confirm completion of the cash exchange by activating a confirmation icon displayed by the banking app 164 on the user interface of their respective mobile smartphones. At block 812, the banking app 164 of the first confirming party may notify the application server 102 of the first confirmation.

Next, at block 814, the application server 102 may debit the withdrawer's mobile wallet balance by an amount equal to the sum of the requested cash withdrawal amount and the agreed transaction fee. At block 816, the application server 102 may transfer the debited sum to an escrow account held by the application server and await confirmation from the other party to the cash withdrawal transaction.

Next, when the application server 102 receives the awaited second confirmation from the other party, the application server may, at block 818, transfer the debited sum from the escrow account to the depositor's mobile wallet. At block 820, the application server 102 may notify the banking apps 164 on the parties' respective mobile smartphones that the cash withdrawal transaction has been successfully closed.

At block 822, the banking app 164 on the mobile smartphone of each party to the cash withdrawal transaction may request that party to rate the other party to the transaction. For instance, the rating may be on a scale of 1 to 5, where 5 is the highest ranking. As another example, the rating may be a binary indication of whether or not the party would recommend conducting cash transactions with the other party.

Notably, the features of debiting and crediting electronic funds accounts in conjunction with a physical cash exchange between two parties are an improvement to existing banking technology. Traditionally, a party must visit a bank or an ATM to withdraw cash from or deposit cash to an electronic funds account. Due to this limitation, a party may be unable to withdraw cash or deposit cash in an area where there are not any banks or ATMs. Computer implementation, however, enables a party to withdraw cash from or deposit cash to an electronic funds account without visiting a bank or an ATM. Consequently, the disclosure herein is a technological improvement to financial transactions.

Moreover, the features of debiting and crediting electronic funds accounts in conjunction with a physical cash exchange between two parties represent a physical to digital and digital to physical conversion. Specifically, physical cash is transferred from a depositor to a withdrawer. Subsequently, the physical cash exchange is accompanied by a corresponding digital cash transaction between a withdrawer electronic funds account and a depositor electronic funds account, vice versa. Thus, the intersection of the new features of these embodiments and the computer implementation thereof go beyond conventional and routine operations.

VIII. Example Operation—Issuing a Cash Deposit Request

The following example describes an application of the system 100 by a user (referred to as a "depositor") to issue a cash deposit request to another user of the system (referred to as a "receiver"). The depositor and the receiver may have already set up their respective user profiles 110 on the application server 102.

Figure 9:
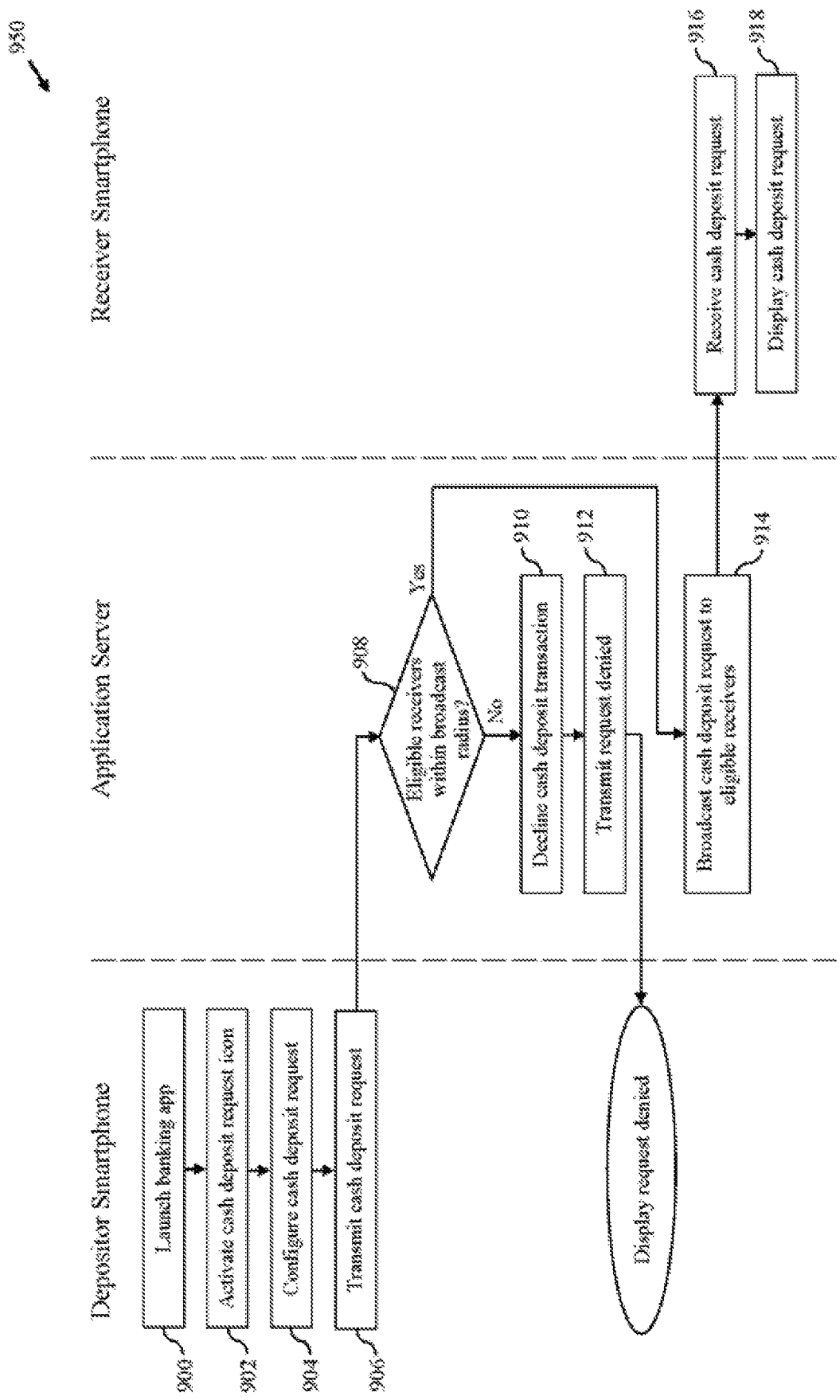
FIG. 9 is yet another flow chart, in accordance with example embodiments.

FIG. 9 is a flow chart depicting a set of functions 950 that can be carried out in accordance with an example embodiment. The set of functions 950 can be used to deposit cash into the depositor's mobile wallet. The set of functions 950 is shown within blocks 900 through 918. A description of those blocks now follows.

At block 900, the depositor may launch the banking app 164 on the depositor's mobile smartphone. At block 902, the depositor may activate a new cash deposit request using an activation icon displayed by the banking app in the user interface 154. The depositor may then configure, at block 904, details of the cash deposit request. The details may include a deposit amount, an expiry date and an expiry time for the cash deposit request, a date and a time by which the cash deposit is required, and a maximum broadcast radius of the cash deposit request. In one embodiment, the maximum broadcast radius may be the maximum distance between the depositor and any receivers who may receive the broadcast message.

Next, at block 906, the banking app 164 on the depositor's mobile smartphone may transmit the depositor's cash deposit request details to the application server 102. Next, at block 908, the application server 102 may determine whether there are any other users of the system 100 that are "eligible receivers." For example, the application server 102 may determine whether there are any other users that: have activated and configured the personal ATM functionality of the banking app 164 on their respective mobile smartphones to receive cash deposit requests; are located within the maximum broadcast radius specified in the depositor's cash deposit request; and for whom the depositor is located within their maximum reception radius for cash deposit requests.

If there are not any eligible receivers located within the maximum specified broadcast radius of the cash deposit request, the application server 102 may decline the depositor's cash deposit request at block 910 and notify, at block 912, the banking app 164 on the depositor's mobile smartphone.

If there are one or more eligible receivers, at block 914, the application server 102 may broadcast the depositor's cash deposit request to all eligible receivers. At block 916, the receiver's mobile smartphone may receive the depositor's cash deposit request from the application server 102. Next, at block 918, the banking app 164 on the receiver's mobile smartphone may display the received cash deposit request on the user interface 154 of the mobile smartphone.

Notably, the operation of determining whether there are any eligible receivers (e.g., the operation at block 908) necessitates computer implementation, especially when the depositor is beyond visible range and auditory range of one or more other users of the system 100. Without the intervention of an application server, it would be difficult for the depositor to ascertain the location of another user, let alone to ascertain whether the other user is willing and able to participate in a cash exchange, when the depositor is beyond visible range and auditory range of the other user. In contrast, the computer implementation herein allows the application server to determine eligible receivers, since the application server has access to the locations of the depositor and the other users as well as the personal ATM parameters for the other users. Consequently, this feature of the disclosure herein would not exist but for computer technology.

IX. Example Operation—Accepting a Cash Deposit Request

The following example describes an application of the system 100 by a user (referred to as a "receiver") to respond to a cash deposit request received from another user of the system (referred to as a "depositor").

Figure 10:
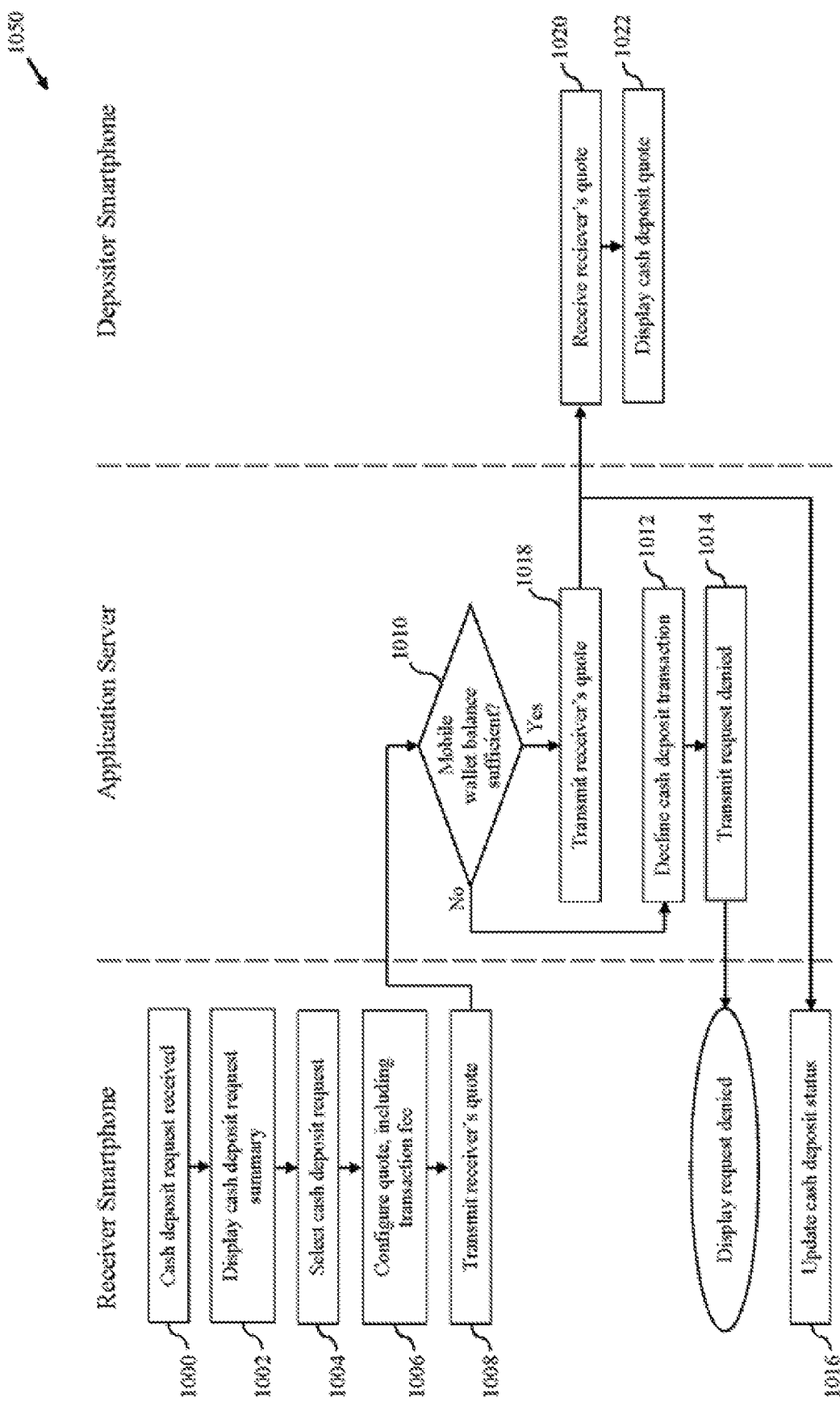
FIG. 10 is yet another flow chart, in accordance with example embodiments.

FIG. 10 is a flow chart depicting a set of functions 1050 that can be carried out in accordance with an example embodiment. The set of functions 1050 can be used to respond to a cash deposit request by providing an offer to participate in a peer-to-peer exchange of cash. The set of functions 1050 is shown within blocks 1000 through 1022. A description of those blocks now follows.

At block 1000, the banking app 164 on a receiver's mobile smartphone may notify the receiver that one or more cash deposit requests have been received from the application server 102. The receiver may cause the cause the banking app 164 to display, at block 1002, a summary of all outstanding cash deposit requests received from the application server 102. In one example, the cash deposit request summary may include, for each outstanding cash deposit request, an indication of the depositor's identity, a requested deposit amount, a distance to the depositor, an elapsed time since the application server 102 received the cash deposit request, and a countdown timer displaying a time remaining until expiry of the depositor's cash deposit request.

At block 1004, the receiver may select one of the outstanding cash deposit requests in the summary in order to view further particulars of the selected request. The further particulars may include a time by which the depositor requires the deposit to be made, and a rating associated with the depositor.

Next, at block 1006, the receiver may configure, using the banking app 164, an offer in response to the selected cash deposit request (referred to as a "quote"). In one embodiment, the quote may include a transaction fee requested by the receiver for participating in a peer-to-peer exchange of cash with the depositor. In one embodiment the transaction fee may be a function of the depositor's rating. In one embodiment, the application server 102 may determine an average transaction fee based on past completed cash deposit transactions and transmit this to the banking app 164 on the receiver's mobile smartphone for consideration by the receiver when configuring the quote in response to the selected cash deposit request.

The banking app 164 on the receiver's mobile smartphone may then, at block 1008, transmit the receiver's quote for the selected cash deposit request to the application server 102. The application server may, at block 1010, determine whether the balance of funds in the receiver's mobile wallet is sufficient to cover the required cash deposit amount. If the receiver's mobile wallet balance is less than the cash deposit amount, the application server 102 may decline the receiver's quote at block 1012 and notify, at block 1014, the banking app 164 on the receiver's mobile smartphone.

If the receiver's mobile wallet balance is not less than the cash deposit amount, the banking app on the receiver's mobile smartphone may update, at block 1016, the displayed status of the selected cash deposit to display that the receiver has submitted a quote indicating the required transaction fee.

Next, at block 1018, the application server 102 may transmit the quote received from the receiver to the mobile smartphone of the depositor who issued the cash deposit request to which the quote relates. At block 1020, the depositor's mobile smartphone may receive the receiver's quote from the application server 102. At block 1022, the banking app 164 on the depositor's mobile smartphone may display the received cash deposit quote on the user interface 154 of the mobile smartphone.

X. Example Operation—Accepting a Cash Deposit Quote

The following example describes an application of the system 100 by a user (referred to as a "depositor") to accept a quote from another user of the system (referred to as a "receiver") in response to a cash deposit request from the depositor.

Figure 11:
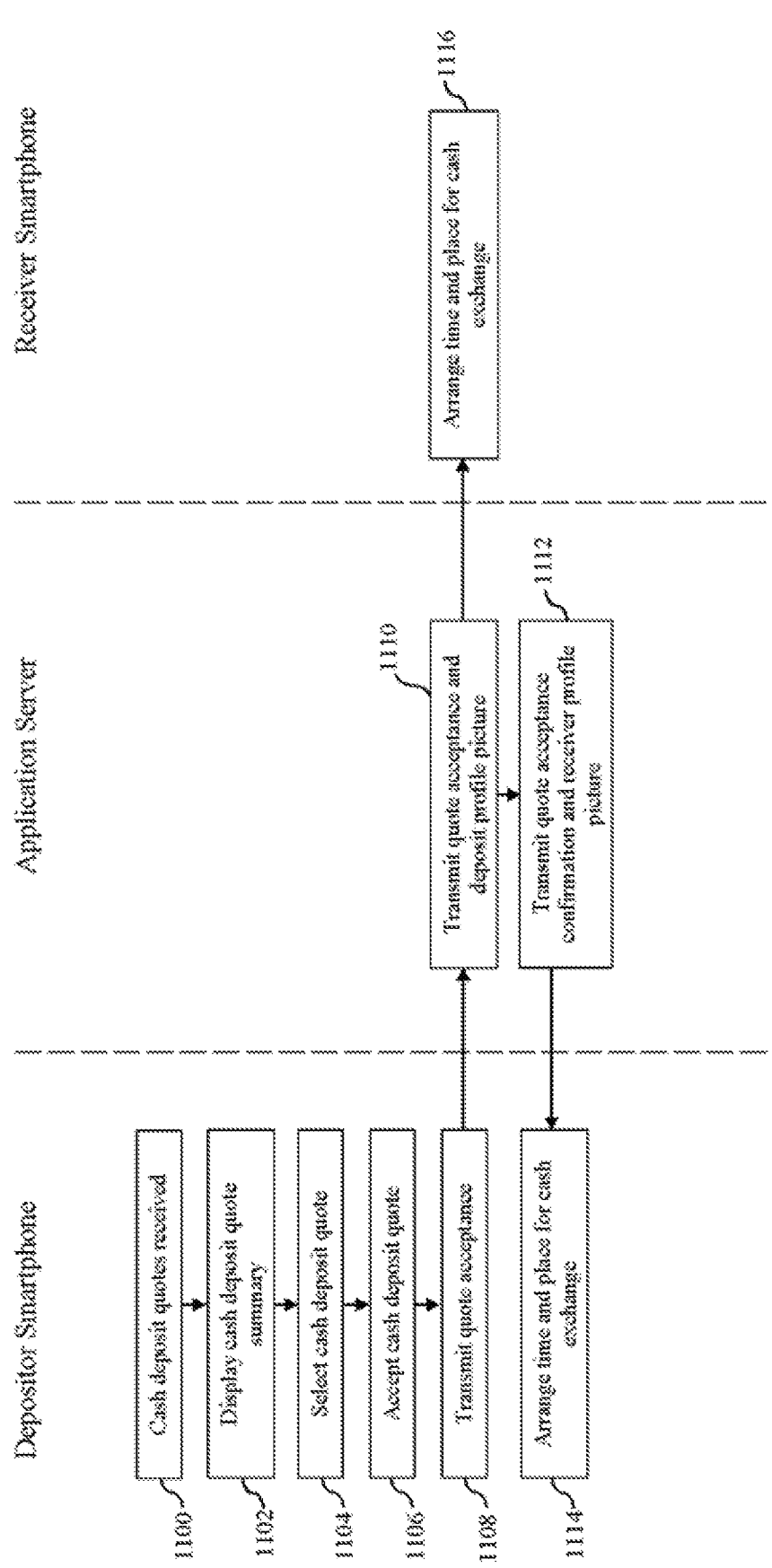
FIG. 11 is yet another flow chart, in accordance with example embodiments.

FIG. 11 is a flow chart depicting a set of functions 1150 that can be carried out in accordance with an example embodiment. The set of functions 1150 can be used to accept a quote for a peer-to-peer cash exchange associated with a cash deposit request. The set of functions 1150 is shown within blocks 1100 through 1116. A description of those blocks now follows.

At block 1100, the banking app 164 on the depositor's mobile smartphone may notify the depositor that one or more quotes have been received from the application server 102 in response to the depositor's cash deposit request. The depositor may, at block 1102, cause the banking app to display a summary of all cash deposit quotes received from the application server 102. In one example, the cash deposit quote summary may include, for each quote, an indication of the quoting recipient's identity, the deposit amount to which the quote relates, a distance to the recipient, an elapsed time since the application server 102 received the cash deposit quote, and the transaction fee requested by the quoting recipient for participating in a peer-to-peer cash exchange with the depositor.

At block 1104, the depositor may select one of the received cash deposit quotes in order to analyze further particulars of the quote. The further particulars may include a rating associated with the quoting receiver.

Next, at block 1106, the depositor may accept the selected cash deposit quote. At block 1108, the banking app 164 may transmit the depositor's acceptance of the receiver's quote to the application server 102. At block 1110, the application server may transmit the depositor's acceptance of the receiver's quote to the receiver, together with the depositor's profile picture from the depositor's profile 110 on the application server. At block 1112, the application server 102 may transmit confirmation of the depositor's acceptance of the quote to the banking app 164 on the depositor's mobile smartphone, together with a profile picture of the receiver from the receiver's profile 110 on the application server.

At blocks 1114 and 1116, the depositor and the receiver who submitted the selected quote may arrange a time and a place to meet in order to conduct the peer-to-peer cash exchange. In one embodiment, the meeting between the depositor and the selected receiver may be arranged using a social media application such as Instagram or Facebook, for example. Alternatively, the meeting may be arranged using a messaging facility included within the banking app 164. In still another embodiment, the meeting may be arranged using text messaging. In still another embodiment, the application server may provide the locations of the depositor and the receiver to the receiver and depositor, respectively, and so that the mobile smartphones of both parties can display a map that indicates the locations of both of the parties. In a further embodiment, the map may also indicate one or more suggested safe locations to perform the cash exchange, such as near a local police department or government facility.

XI. Example Operation—Cash Deposit Exchange and Confirmation

The following example describes an application of the system 100 to complete a cash deposit transaction between two users of the system (referred to as a "depositor" and a "receiver", respectively and, collectively, as the "parties").

Figure 12:
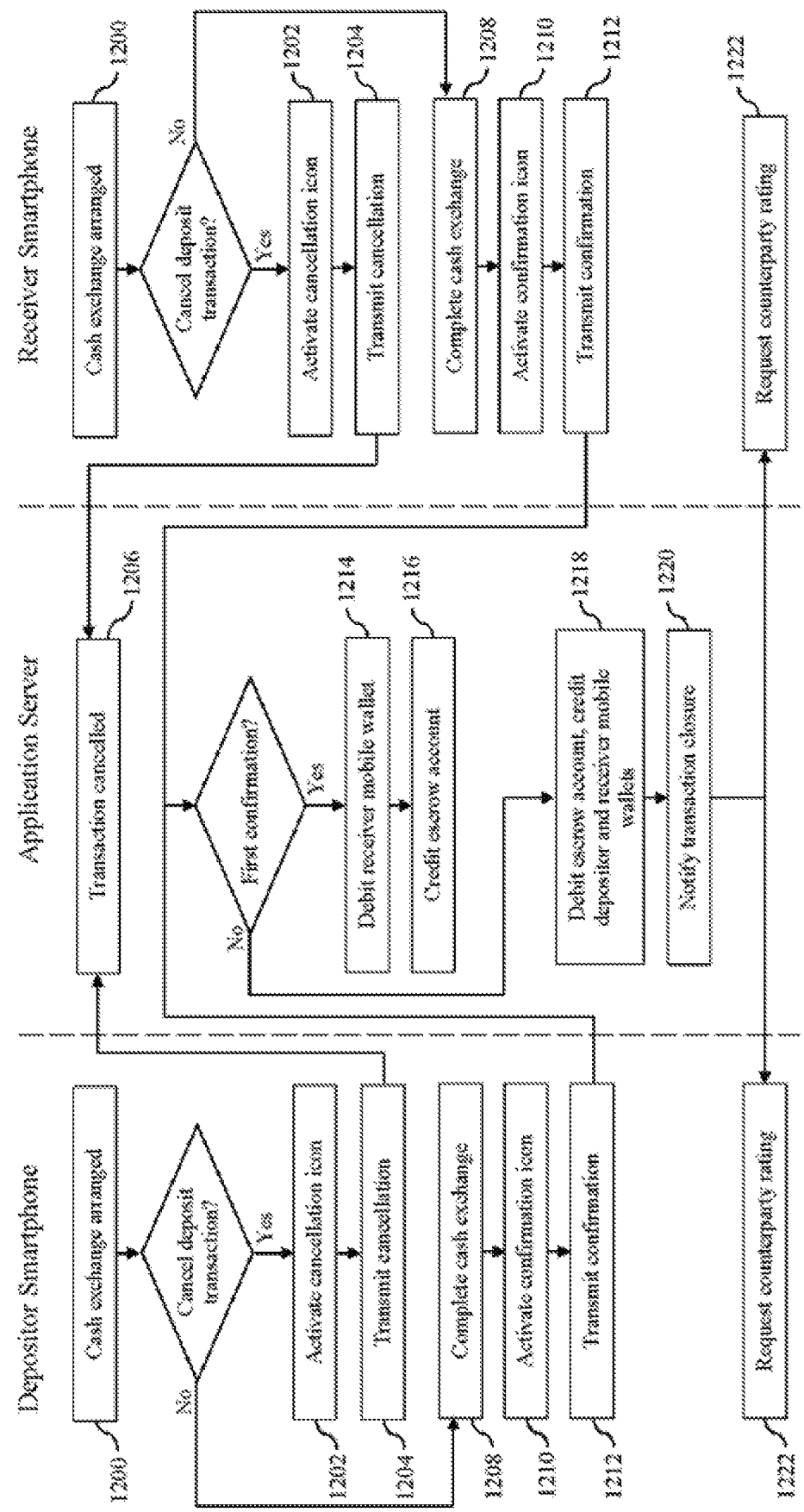
FIG. 12 is yet another flow chart, in accordance with example embodiments.

FIG. 12 is a flow chart depicting a set of functions 1250 that can be carried out in accordance with an example embodiment. The set of functions 1250 can be used to complete or, alternatively, to cancel, a peer-to-peer cash exchange as part of a cash deposit transaction. The set of functions 1250 is shown within blocks 1200 through 1222. A description of those blocks now follows.

At block 1200, a depositor and a receiver may have arranged to meet at an agreed time and place in order to complete a cash deposit transaction in which the depositor has agreed to provide a predetermined sum of cash to the receiver.

Either one of the parties may cancel the agreed cash deposit transaction if so desired by activating, at block 1202, a cancellation icon displayed by the banking app on the user interface 154 of their respective mobile smartphones. Next, at block 1204, the banking app 164 of the cancelling party may notify the application server 102 of the cancellation and, at block 1206, the application server may notify the banking app 164 on the mobile smartphone of the other party of the cancellation.

If neither party cancels the transaction, the depositor may provide to the receiver a sum of cash equal to the requested cash deposit amount (block 1208). Next, at block 1210, a first one of the depositor and the recipient may confirm completion of the cash exchange by activating a confirmation icon displayed by the banking app 164 on the user interface of their respective mobile smartphones. At block 1212, the banking app of the first confirming party may notify the application server 102 of the first confirmation.

Next, at block 1214, the application server 102 may debit the receiver's mobile wallet balance by the requested cash deposit amount. At block 1216, the application server 102 may transfer the debited sum to an escrow account held by the application server and await confirmation from the other party to the cash deposit transaction.

Next, when the application server 102 receives the awaited second confirmation from the other party, the application server may, at block 1218, transfer the debited sum from the escrow account to the depositor's and receiver's mobile wallets in the following proportions: an amount equal to the agreed transaction fee to the receiver's mobile wallet; and an amount equal to the requested cash deposit amount less the transaction fee to the depositor's mobile wallet.

At block 1220, the server 102 may notify the banking apps 164 on the parties' respective mobile smartphones that the cash deposit transaction has been successfully closed.

At block 1222, the banking app 164 on the mobile smartphone of each party to the cash deposit transaction may request that party to rate the other party to the transaction. For instance, the rating may be on a scale of 1 to 5, where 5 is the highest rating. As another example, the rating may be a binary indication of whether or not the party would recommend conducting cash transactions with the other party.

Notably, the features of debiting and crediting electronic funds accounts in conjunction with a physical cash exchange between two parties are an improvement to existing banking technology. Traditionally, a party must visit a bank or an ATM to withdraw cash from or deposit cash to an electronic funds account. Due to this limitation, a party may be unable to withdraw cash or deposit cash in an area where there are not any banks or ATMs. Computer implementation, however, enables a party to withdraw cash from or deposit cash to an electronic funds account without visiting a bank or an ATM. Consequently, the disclosure herein is a technological improvement to financial transactions.

Moreover, the features of debiting and crediting electronic funds accounts in conjunction with a physical cash exchange between two parties represent a physical to digital and digital to physical conversion. Specifically, physical cash is transferred from a depositor to a receiver. Subsequently, the physical cash exchange is accompanied by a corresponding digital cash transaction between a depositor electronic funds account and a receiver electronic funds account, vice versa. Thus, the intersection of the new features of these embodiments and the computer implementation thereof go beyond conventional and routine operations.

XII. Example Operation—User Ratings

In order to assist users of the system in assessing incoming cash withdrawal and cash deposit requests, and in evaluating incoming cash withdrawal and cash deposit quotes, the application server 102 may maintain a user rating for each user of the system 100. In this way, a party to a transaction may take note of the rating of a potential counterparty to a cash deposit or a cash withdrawal transaction before submitting a quote in response to a transaction request or accepting a submitted quote.

In one embodiment, such a user rating may be a five-level rating, for example 1 to 5 stars, where 5 stars is the most favourable rating.

A user's rating may be a function, for example, of a ratio of successfully-closed cash withdrawal and cash deposit transactions in which the user has been a party (either as a request issuer or as a quote provider). A user's star rating may be determined according to the following table:

| Successful Transaction Ratio | Star Rating |
|---|---|
| $0.0 < R \le 0.1$ | Unrated |
| $0.1 < R \le 0.2$ | * |
| $0.2 < R \le 0.4$ | ** |
| $0.4 < R \le 0.6$ | *** |
| $0.6 < R \le 0.8$ | **** |
| $0.8 < R \le 1.0$ | ***** | where R=number of successfully-closed transactions/total number of transactions.

A user may, for example, wish to only consider cash withdrawal and cash deposit requests received from users with 4- or 5-star ratings. Similarly, users who have issued cash deposit or cash withdrawal requests may only wish to consider quotes received from users with 5-star ratings.

In addition, a user who is a party to a cash withdrawal or a cash deposit transaction may be discouraged from cancelling the transaction due to the adverse effect that the cancellation will have on the user's rating since such a cancelled transaction will decrease the ratio R of successfully-closed transactions, as described above.

XIII. Additional Example Operations

Figure 13:
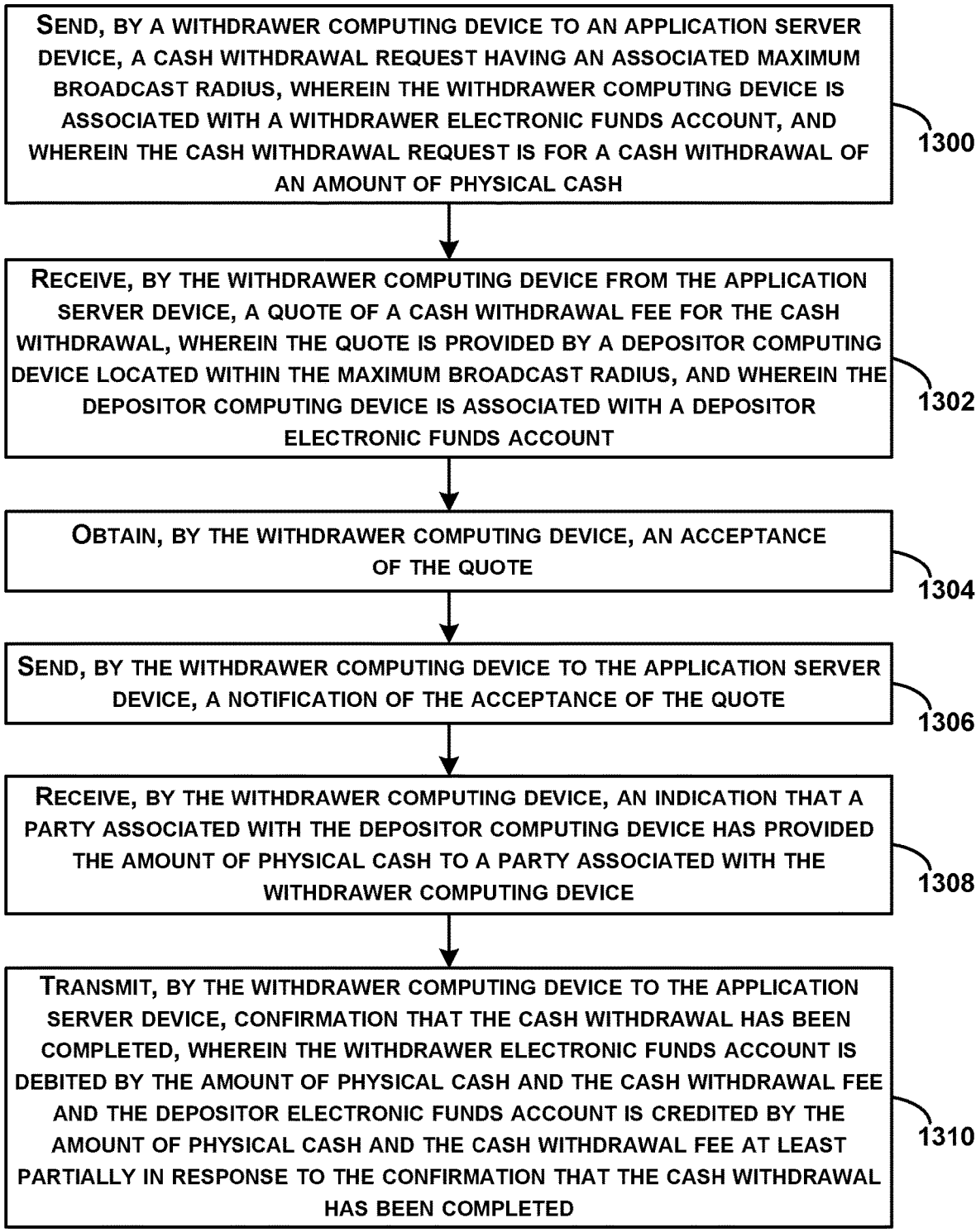
FIG. 13 is yet another flow chart, in accordance with example embodiments.

FIG. 13 depicts a flow chart showing a set of operations that can, for example, be carried out using a computing device, such as the computing device 106. Several of the operations described in connection with FIG. 13 parallel operations described in connection with FIGS. 5-8. As such, variations of the operations described in connection with FIGS. 5-8 are likewise applicable to the operations described in connection with FIG. 13. However, for the sake of brevity, these variations are not repeated.

Initially, block 1300 includes sending, by a withdrawer computing device to an application server device, a cash withdrawal request having an associated maximum broadcast radius. The withdrawer computing device can be associated with a withdrawer electronic funds account, and the cash withdrawal request can be for a cash withdrawal of an amount of physical cash. In some embodiments, the cash withdrawal request may specify an expiration time of the cash withdrawal request beyond which the cash withdrawal request is no longer valid.

Next, block 1302 includes receiving, by the withdrawer computing device from the application server device, a quote of a cash withdrawal fee for the cash withdrawal. The quote can be provided by a depositor computing device located within the maximum broadcast radius, and the depositor computing device can be associated with a depositor electronic funds account.

In some embodiments, the depositor computing device can be located beyond visual range and auditory range of the withdrawer computing device. For example, at a time when the cash withdrawal request is provided, a party associated with the withdrawer computing device might not be able to see or hear a party associated with the depositor computing device.

In some embodiments, one or both of the withdrawer computing device and the depositor computing device can be a mobile wireless computing device.

Next, block 1304 includes obtaining, by the withdrawer computing device, an acceptance of the quote. In some embodiments, obtaining the acceptance of the quote can be based on the withdrawer electronic funds account containing a value greater than or equal to the amount of physical cash and the cash withdrawal fee. In some embodiments, obtaining the acceptance of the quote can include displaying, by the withdrawer computing device, the quote.

In some embodiments, the withdrawer computing device may receive from the application server device a second quote of a second cash withdrawal fee for the cash withdrawal (not shown). The second quote can be provided by a second depositor computing device located within the maximum broadcast radius. The withdrawer computing device can then display the quote and the second quote. Further, obtaining the acceptance of the quote can include receiving, by the withdrawer computing device, a selection of the quote.

Next, block 1306 includes sending, by the withdrawer computing device to the application server device, a notification of the acceptance of the quote. In some embodiments, after sending the notification of the acceptance of the quote, the withdrawer computing device can receive an image of a party associated with the depositor computing device and display the image (not shown).

Next, block 1308 includes receiving, by the withdrawer computing device an indication that a party associated with the depositor computing device has provided the amount of physical cash to a party associated with the withdrawer computing device.

Next, block 1310 includes transmitting, by the withdrawer computing device to the application server device, confirmation that the cash withdrawal has been completed. At least partially in response to the confirmation that the cash withdrawal has been completed, the withdrawer electronic funds account can then be debited by the amount of physical cash and the cash withdrawal fee. The depositor electronic funds account can then be credited by the amount of physical cash and the cash withdrawal fee.

In some embodiments, the withdrawer computing device may receive a rating for the cash withdrawal and transmit the rating to the application server device (not shown).

Figure 14:
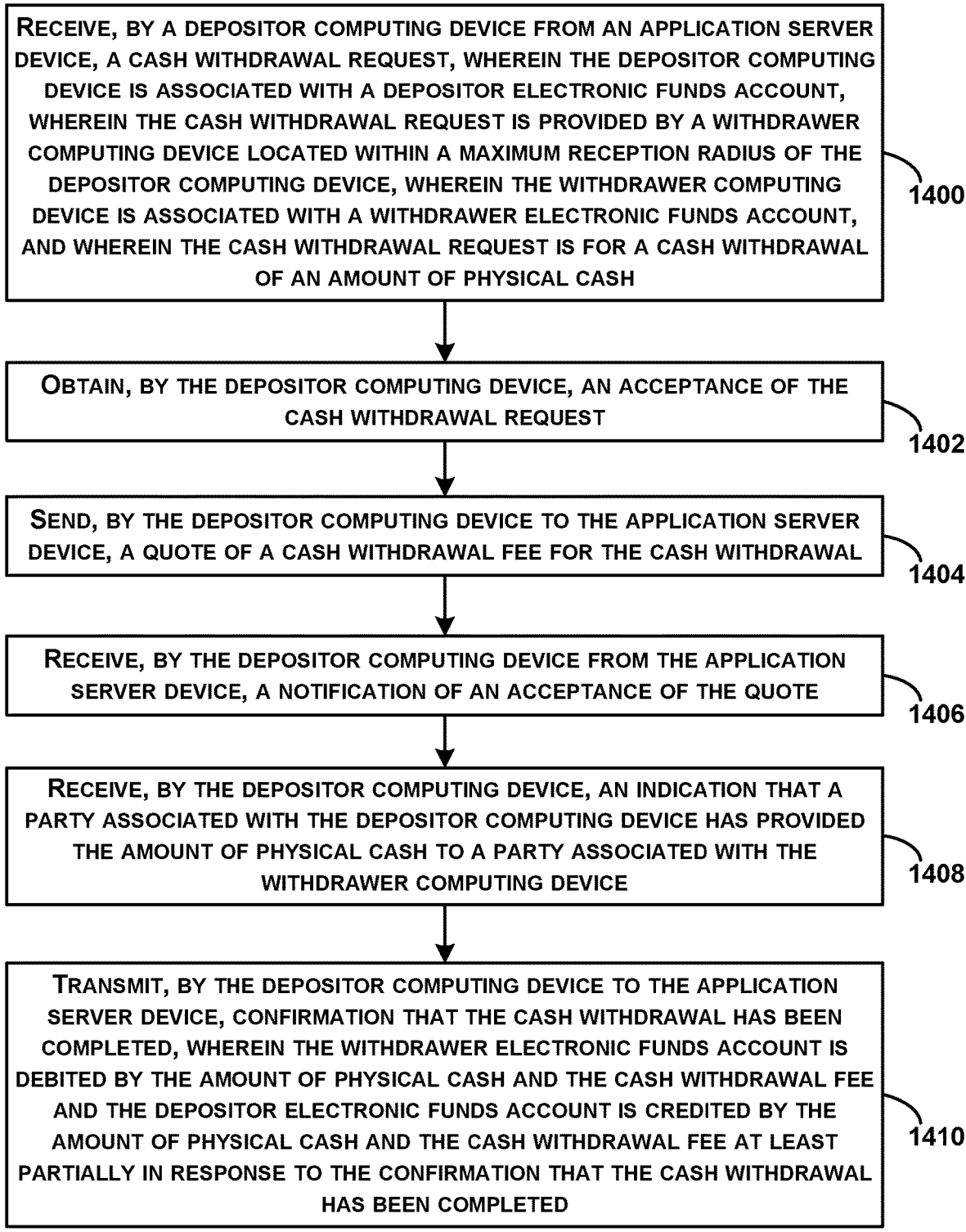
FIG. 14 is yet another flow chart, in accordance with example embodiments.

FIG. 14 depicts a flow chart showing a set of operations that can, for example, be carried out using a computing device, such as the computing device 106. Several of the operations described in connection with FIG. 14 parallel operations described in connection with FIGS. 5-8. As such, variations of the operations described in connection with FIGS. 5-8 are likewise applicable to the operations described in connection with FIG. 14. However, for the sake of brevity, these variations are not repeated.

Initially, block 1400 includes receiving, by a depositor computing device from an application server device, a cash withdrawal request. The depositor computing device can be associated with a depositor electronic funds account. The cash withdrawal request can be provided by a withdrawer computing device located within a maximum reception radius of the depositor computing device, and the withdrawer computing device can be associated with a withdrawer electronic funds account. The cash withdrawal request can be for an amount of physical cash. In some embodiments, one or both of the depositor computing device and the withdrawer computing device can be a mobile wireless computing device. In some embodiments, the cash withdrawal request may specify an expiration time of the cash withdrawal request beyond which the cash withdrawal is no longer valid.

Next, block 1402 includes obtaining, by the depositor computing device, an acceptance of the cash withdrawal request. In some embodiments, obtaining the acceptance of the cash withdrawal request may include displaying, by the depositor computing device, the cash withdrawal request.

In some embodiments, the depositor computing device can receive from the application server device a second cash withdrawal request (not shown). The second cash withdrawal request may be provided by a second withdrawer computing device located within the maximum reception radius, and the second cash withdrawal request can be for a second cash withdrawal of a second amount of physical cash. Further, obtaining the acceptance of the cash withdrawal request may include receiving, by the depositor computing device, a selection of the cash withdrawal request.

In some embodiments, the depositor computing device can be located beyond visual range and auditory range of the withdrawer computing device.

Next, block 1404 includes sending, by the depositor computing device to the application server device, a quote of a cash withdrawal fee for the cash withdrawal. In some embodiments, after sending the quote, the depositor computing device can receive an image of a party associated with the withdrawer computing device and display the image (not shown).

Next, block 1406 includes receiving, by the depositor computing device from the application server device, a notification of an acceptance of the quote.

Next, block 1408 includes receiving, by the depositor computing device, an indication that a party associated with the depositor computing device has provided the amount of physical cash to a party associated with the withdrawer computing device.

Next, block 1410 includes transmitting, by the depositor computing device to the application server device, confirmation that the cash withdrawal has been completed. At least partially in response to the confirmation that the cash withdrawal has been completed, the withdrawer electronic funds account can be debited by the amount of physical cash and the cash withdrawal fee and the depositor electronic funds account can be credited by the amount of physical cash and the cash withdrawal fee.

In some embodiments, the depositor computing device can receive a rating for the cash withdrawal and transmit the rating to the application server device (not shown).

Figure 15A:
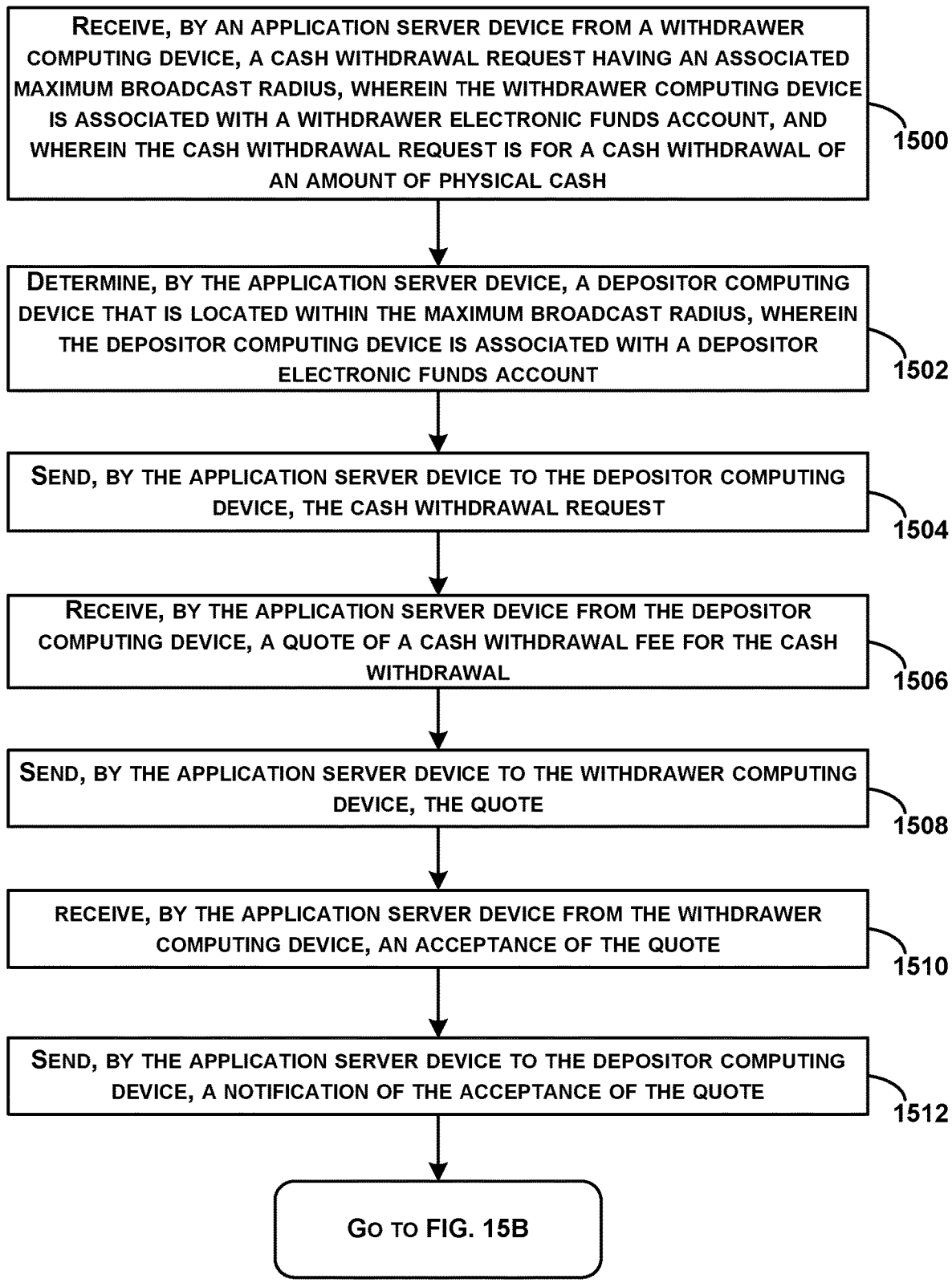
FIG. 15A is a first part of a flow chart, in accordance with example embodiments.
Figure 15B:
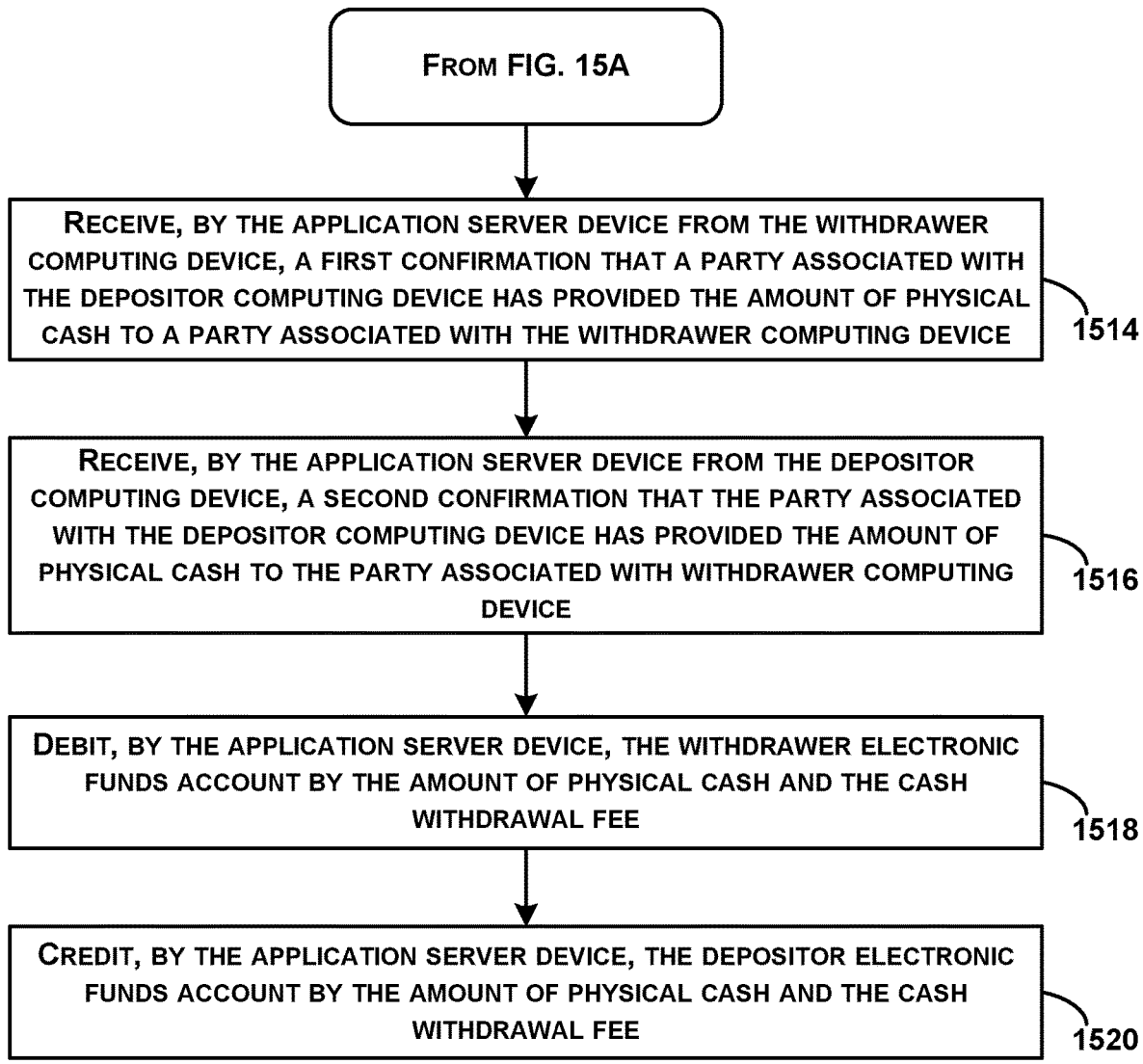
FIG. 15B is a second part of the flow chart of FIG. 15A, in accordance with example embodiments.

FIGS. 15A and 15B depict respective parts of a flow chart showing a set of operations that can, for example, be carried out using a computing device, such as the application server device 102. Several of the operations described in connection with FIGS. 15A and 15B parallel operations described in connection with FIGS. 5-8. As such, variations of the operations described in connection with FIGS. 5-8 are likewise applicable to the operations described in connection with FIGS. 15A and 15B. However, for the sake of brevity, these variations are not repeated.

Turning to FIG. 15A, initially, block 1500 includes receiving by an application server device from a withdrawer computing device, a cash withdrawal request having an associated maximum broadcast radius. The withdrawer computing device can be associated with a withdrawer electronic funds account, and the cash withdrawal request can be for a cash withdrawal of an amount of physical cash. In some embodiments, the cash withdrawal request may specify an expiration time of the cash withdrawal request beyond which the cash withdrawal is no longer valid.

Next, block 1502 includes determining, by the application server device, a depositor computing device that is located within the maximum broadcast radius. The depositor computing device can be associated with a depositor electronic funds account. In some embodiments, one or both of the withdrawer computing device and the depositor computing device may be a mobile wireless computing device.

Next, block 1504 includes sending, by the application server device to the depositor computing device, the cash withdrawal request. In some embodiments, the application server device may send to the depositor computing device with the cash withdrawal request a rating of a party associated with the withdrawer computing device.

In some embodiments, the application server device may determine that the withdrawer computing device is located within a maximum reception radius associated with the depositor computing device, and the application server device may then send the cash withdrawal request at least in response to determining that the withdrawer computing device is located within the maximum reception radius.

In some embodiments, the application server device may determine that the withdrawer electronic funds account contains a value greater than or equal to the amount of physical cash, and may then send the cash withdrawal request at least in response to determining that the withdrawer electronic funds account contains the value greater than or equal to the amount of physical cash.

Next, block 1506 includes receiving, by the application server device from the depositor computing device, a quote of a cash withdrawal fee for the cash withdrawal.

Next, block 1508 includes sending, by the application server device to the withdrawer computing device, the quote. In some embodiments, the application server device may send to the withdrawer computing device with the quote a rating of a party associated with the depositor computing device.

In some embodiments, the application server device may determine a second depositor computing device that is located with the maximum broadcast radius (not shown). The application server device may then send the cash withdrawal request to the second depositor computing device. Further, the application server device may receive from the second depositor computing device a second quote of a second cash withdrawal fee for the cash withdrawal, and the application server device may send the second quote to the withdrawer computing device.

Next, block 1510 includes receiving, by the application server device from the withdrawer computing device, an acceptance of the quote. In some embodiments, after receiving the acceptance of the quote, the application server device may send to the withdrawer computing device an image of a party associated with the depositor computing device.

Next, block 1512 includes sending, by the application server device to the depositor computing device, a notification of the acceptance of the quote.

Turning to FIG. 15B, block 1514 includes receiving, by the application server device from the withdrawer computing device, a first confirmation that a party associated with the depositor computing device has provided the amount of physical cash to a party associated with the withdrawer computing device.

Next, block 1516 includes receiving, by the application server device from the depositor computing device, a second confirmation that the party associated with the depositor computing device has provided the amount of physical cash to the party associated with the withdrawer computing device.

Next, block 1518 includes, debiting, by the application server device, the withdrawer electronic funds account by the amount of physical cash and the cash withdrawal fee.

Next, block 1520 includes crediting, by the application server device, the depositor electronic funds account by the amount of physical cash and the cash withdrawal fee.

In some embodiments, an application server device (e.g., application server 102) may simultaneously execute operations in real time on behalf of at least 30 computing devices. Each of the at least 30 computing devices may communicate with the application server device by way of a wide-area packet-switched network. In some cases, the application server device may simultaneously execute operations in real time on behalf of more or fewer than 30 computing devices. For instance, this simultaneous execution may involve 10, 20, 50, 100, or 1000 computing devices, or another extent of computing devices.

Particularly, simultaneous execution of such a large number of operations in real time necessitates computer implementation. When taking part in a banking transaction, such as the cash withdrawals and cash deposits disclosed herein, users expect results of operations to be displayed on their respective computing devices in an expeditious fashion (e.g., in real time, such as a few seconds at most per operation). Failure to do so may result in users becoming disinterested in the transaction. Consequently, the embodiments that include this simultaneous execution of a large number of operations in real time would not exist but for computer implementation thereof.

Notably, the operation of determining a depositor computing device that is located within the maximum broadcast radius (e.g., the operation at block 1502) necessitates computer implementation, especially when the withdrawer computing device is beyond visible range and auditory range of one or more other users of the system 100. The computer implementation herein allows the application server device to determine eligible depositor computing devices, since the application server device has access to the locations of the withdrawer computing device and the other users. Consequently, this feature of the disclosure herein would not exist but for computer technology.

Figure 16:
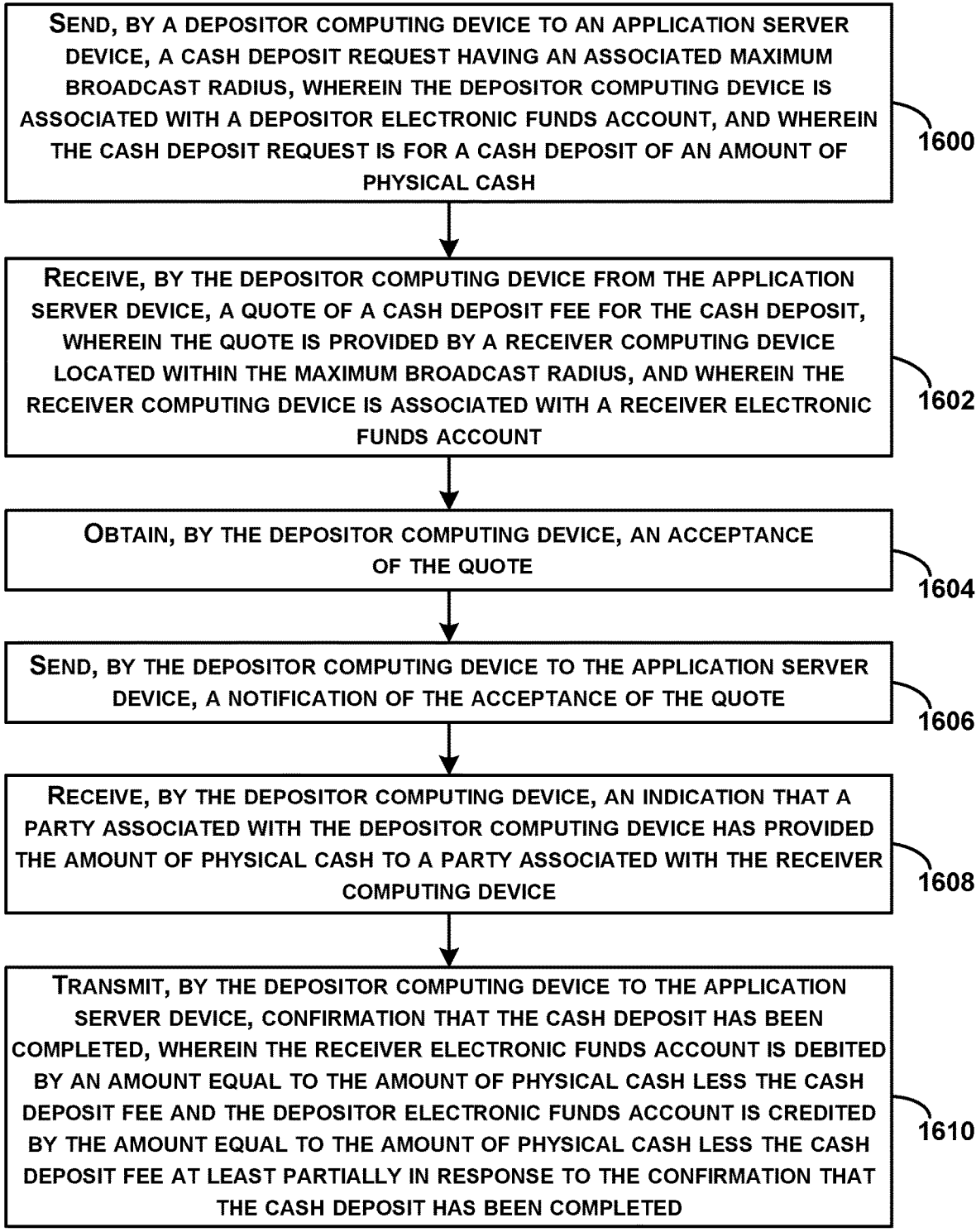
FIG. 16 is yet another flow chart, in accordance with example embodiments.

FIG. 16 depicts a flow chart showing a set of operations that can, for example, be carried out using a computing device, such as the computing device 106. Several of the operations described in connection with FIG. 16 parallel operations described in connection with FIGS. 9-12. As such, variations of the operations described in connection with FIGS. 9-12 are likewise applicable to the operations described in connection with FIG. 16. However, for the sake of brevity, these variations are not repeated.

Initially, block 1600 includes sending, by a depositor computing device to an application server device, a cash deposit request having an associated maximum broadcast radius. The depositor computing device can be associated with a depositor electronic funds account, and the cash deposit request can be for a cash deposit of an amount of physical cash. In some embodiments, the cash deposit request may specify an expiration time of the cash deposit request beyond which the cash deposit request is no longer valid.

Next, block 1602 includes receiving, by the depositor computing device from the application server device, a quote of a cash deposit fee for the cash deposit. The quote can be provided by a receiver computing device located within the maximum broadcast radius, and the receiver computing device can be associated with a receiver electronic funds account. In some embodiments, the receiver computing device may be located beyond visual range and auditory range of the depositor computing device. In some embodiments, one or both of the depositor computing device and the receiver computing device can be a mobile wireless computing device.

Next, block 1604 includes obtaining, by the depositor computing device, an acceptance of the quote. In some embodiments, obtaining the acceptance of the quote may include displaying, by the depositor computing device, the quote. In some embodiments, the depositor computing device may receive from the application server device a second quote of a second cash deposit fee for the cash deposit (not shown). The second quote may be provided by a second receiver computing device located within the maximum broadcast radius. The depositor computing device may then display the quote and the second quote. Further, obtaining the acceptance of the quote may include receiving by the depositor computing device a selection of the quote.

Next, block 1606 includes sending, by the depositor computing device to the application server device, a notification of the acceptance of the quote. In some embodiments, after sending the notification of the acceptance of the quote, the depositor computing device may receive an image of a party associated with the receiver computing device and display the image (not shown).

Next, block 1608 includes receiving, by the depositor computing device, an indication that a party associated with the depositor computing device has provided the amount of physical cash to a party associated with the receiver computing device.

Next, block 1610 includes transmitting, by the depositor computing device to the application server device, confirmation that the cash deposit has been completed. At least partially in response to the confirmation that the cash deposit has been completed, the receiver electronic funds account can be debited by an amount equal to the amount of physical cash less the cash deposit fee and the depositor electronic funds account can be credited by the amount equal to the amount of physical cash less the cash deposit fee.

In some embodiments, the depositor computing device may receive a rating for the cash deposit and transmit the rating to the application server device (not shown).

Figure 17:
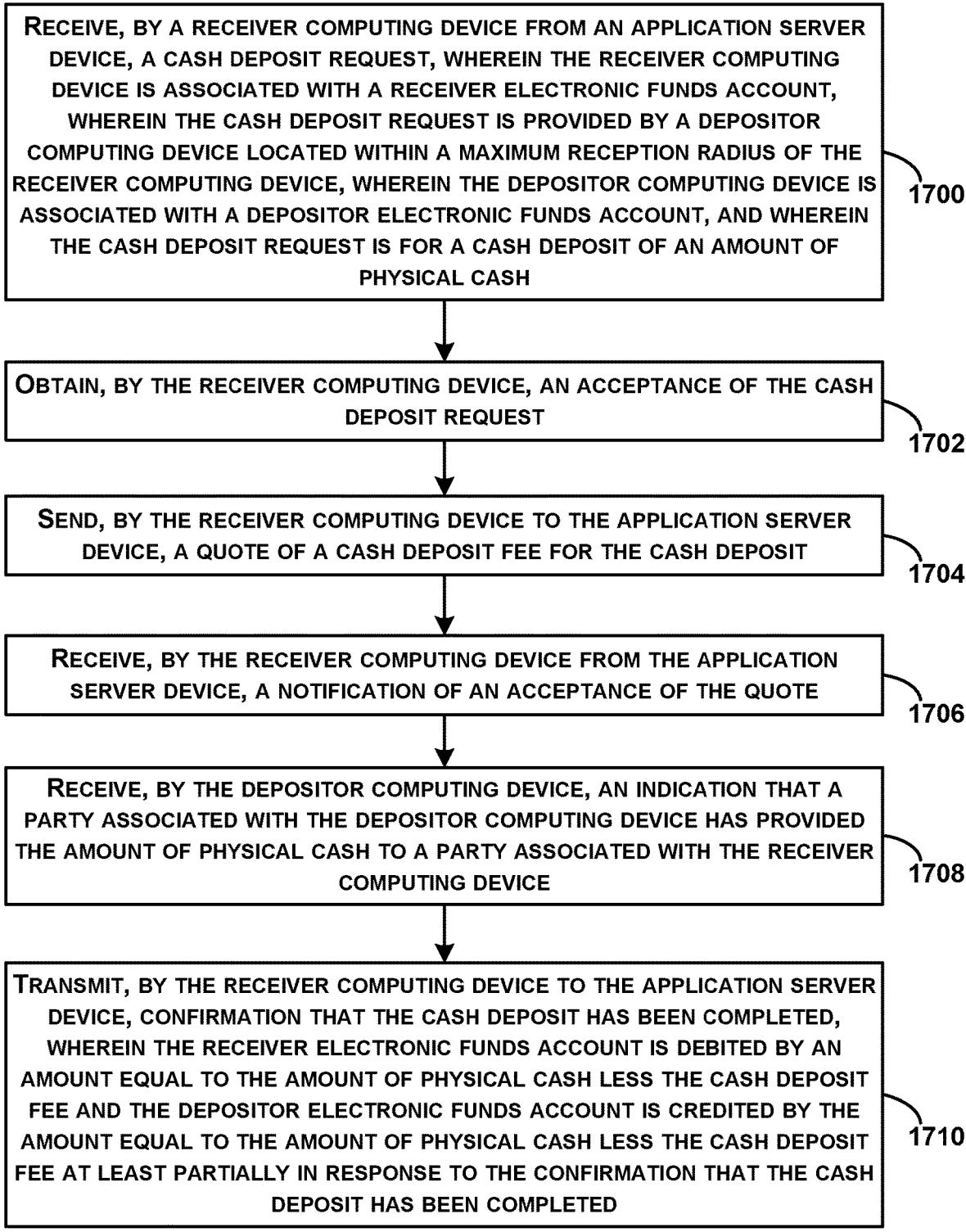
FIG. 17 is yet another flow chart, in accordance with example embodiments.

FIG. 17 depicts a flow chart showing a set of operations that can, for example, be carried out using a computing device, such as the computing device 106. Several of the operations described in connection with FIG. 17 parallel operations described in connection with FIGS. 9-12. As such, variations of the operations described in connection with FIGS. 9-12 are likewise applicable to the operations described in connection with FIG. 17. However, for the sake of brevity, these variations are not repeated.

Initially, block 1700 includes receiving, by a receiver computing device from an application server device, a cash deposit request. The receiver computing device can be associated with a receiver electronic funds account. The cash deposit request can be provided by a depositor computing device located within a maximum reception radius of the receiver computing device, and the depositor computing device can be associated with a depositor electronic funds account. The cash deposit request can be for a cash deposit of an amount of physical cash.

In some embodiments, the receiver computing device may be beyond visual range and auditory range of the depositor computing device. In some embodiments, one or both of the depositor computing device and the receiver computing device may be a mobile wireless computing device. In some embodiments, the cash deposit request may specify an expiration time of the cash deposit request beyond which the cash deposit request is no longer valid.

Next, block 1702 includes obtaining, by the receiver computing device, an acceptance of the cash deposit request. In some embodiments, obtaining the acceptance may include displaying, by the receiver computing device, the cash deposit request. In some embodiments, obtaining the acceptance may be based on the receiver electronic funds account containing a value greater than the amount of physical cash.

In some embodiments, the receiver computing device may receive from the application server device a second cash deposit request (not shown). The second cash deposit request may be provided by a second depositor computing device located within the maximum reception radius, and the second cash deposit request may be for a second cash deposit of a second amount of physical cash. The receiver computing device may then display the cash deposit request and the second cash deposit request. Further, obtaining the acceptance may include receiving, by the receiver computing device, a selection of the cash deposit request.

Next, block 1704 includes sending, by the receiver computing device to the application server device, a quote of a cash deposit fee for the cash deposit.

Next, block 1706 includes receiving, by the receiver computing device from the application server device, a notification of an acceptance of the quote. In some embodiments, after sending the quote, the receiver computing device may receive an image of a party associated with the depositor computing device and display the image.

Next, block 1708 includes receiving, by the depositor computing device, an indication that a party associated with the depositor computing device has provided the amount of physical cash to a party associated with the receiver computing device.

Next, block 1710 includes transmitting, by the receiver computing device to the application server device, confirmation that the cash deposit has been completed. At least partially in response to the confirmation that the cash deposit has been completed, the receiver electronic funds account can then be debited by an amount equal to the amount of physical cash less the cash deposit fee and the depositor electronic funds account can be credited by the amount equal to the amount of physical cash less the cash deposit fee.

In some embodiments, the receiver computing device may receive a rating for the cash deposit and transmit the rating to the application server device (not shown).

Figure 18A:
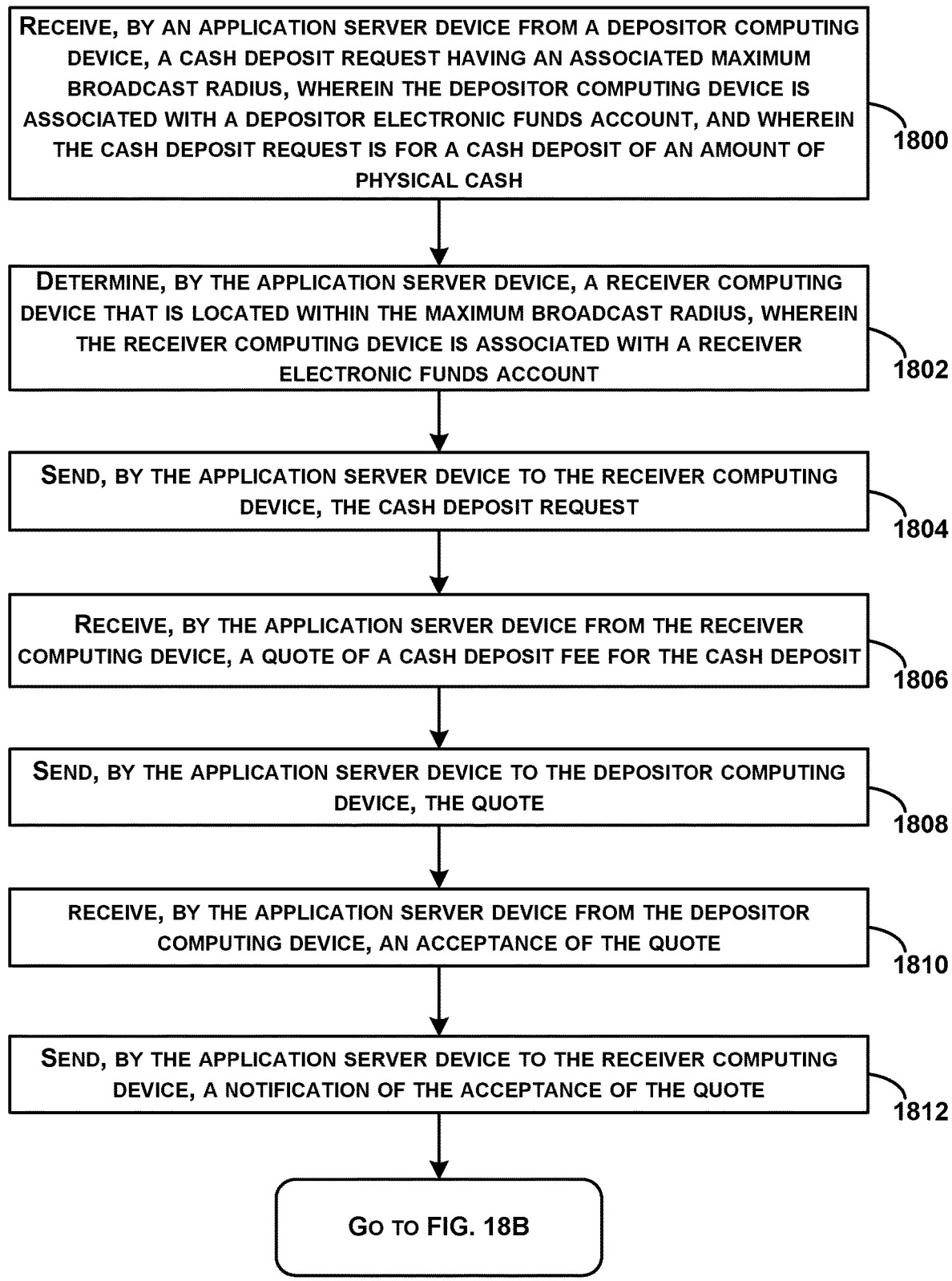
FIG. 18A is a first part of a flow chart, in accordance with example embodiments.
Figure 18B:
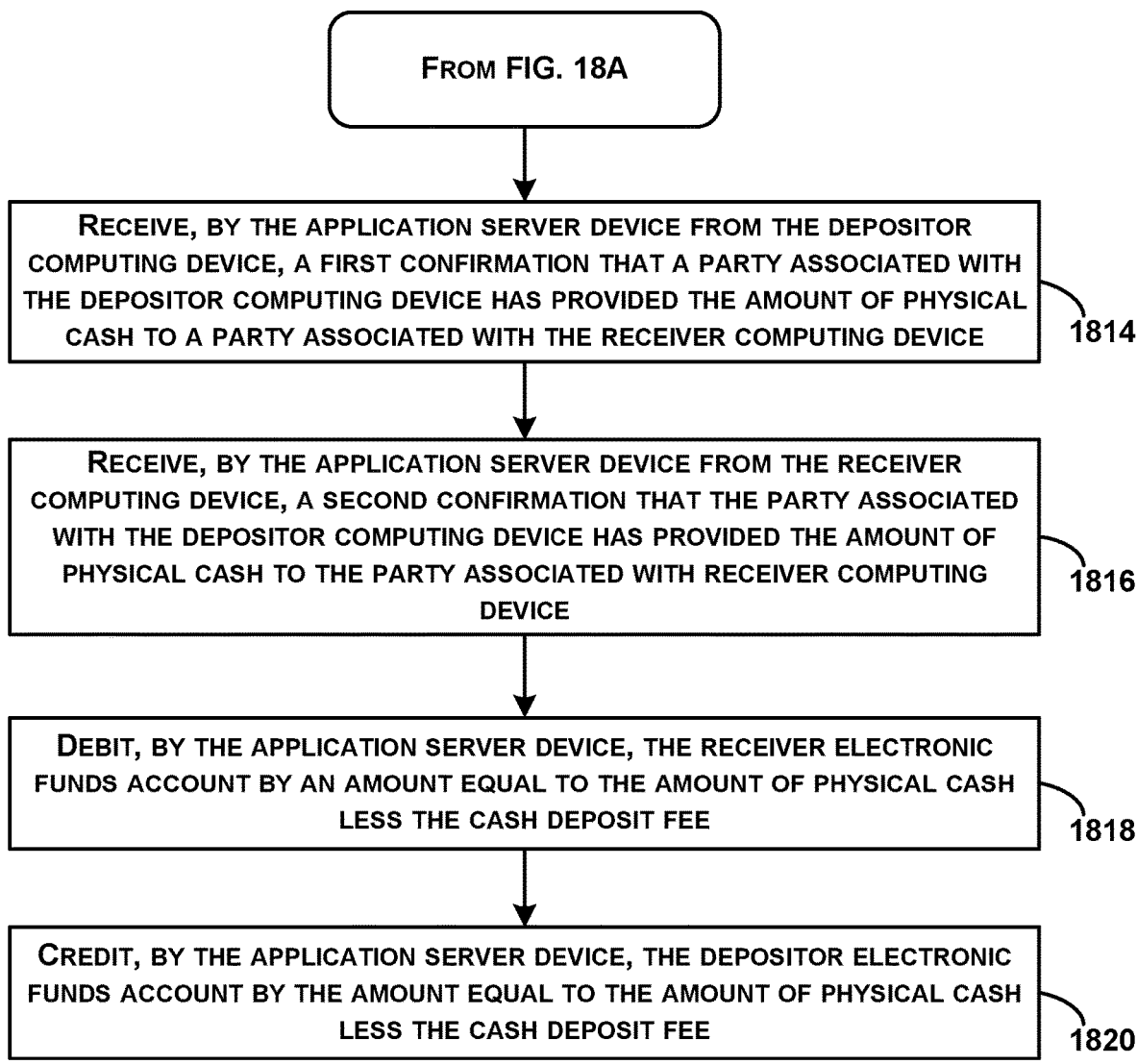
FIG. 18B is a second part of the flow chart of FIG. 18A, in accordance with example embodiments.

FIGS. 18A and 18B depict respective parts of a flow chart showing a set of operations that can, for example, be carried out using a computing device, such as the application server device 102. Several of the operations described in connection with FIGS. 18A and 18B parallel operations described in connection with FIGS. 9-12. As such, variations of the operations described in connection with FIGS. 9-12 are likewise applicable to the operations described in connection with FIGS. 18A and 18B. However, for the sake of brevity, these variations are not repeated.

Turning to FIG. 18A, initially, block 1800 includes receiving, by an application server device form a depositor computing device, a cash deposit request having an associated maximum broadcast radius. The depositor computing device can be associated with a depositor electronic funds account, and the cash depositor request can be for a cash deposit of an amount of physical cash. In some embodiments, the cash deposit request may specify an expiration time of the cash deposit request beyond which the cash deposit request is no longer valid.

Next, block 1802 includes determining, by the application server device, a receiver computing device that is located within the maximum broadcast radius. The receiver computing device can be associated with a receiver electronic funds account. In some embodiments, one or both of the depositor computing device and the receiver computing device may be a mobile wireless computing device.

Next, block 1804 includes sending, by the application server device to the receiver computing device, the cash deposit request. In some embodiments, the application server device may send to the receiver computing device with the cash deposit request a rating of a party associated with the depositor computing device (not shown).

In some embodiments, the application server device may determine that the depositor computing device is located within a maximum reception radius of the receiver computing device (not shown). The application server device may then send the cash deposit request at least in response to determining that the depositor computing device is located within the maximum reception radius.

In some embodiments, the application server device may determine that the depositor electronic funds account contains a value greater than the amount of physical cash (not shown). The application server device may then send the cash deposit request at least in response to determining that the depositor electronic funds account contains the value greater than the amount of physical cash.

Next, block 1806 includes receiving, by the application server device from the receiver computing device, a quote of a cash deposit fee for the cash deposit.

Next, block 1808 includes sending, by the application server device to the depositor computing device, the quote. In some embodiments, the application server device may send to the depositor computing device with the quote a rating of a party associated with the receiver computing device (not shown).

In some embodiments, the application server device may determine a second receiver computing device that is located within the maximum broadcast radius (not shown). The application server device may then send the cash deposit request to the second receiver computing device. Further, the application server device may receive from the second receiver computing device a second quote of a second cash deposit fee for the cash deposit, and the application server device may send to the depositor computing device the second quote.

Next, block 1810 includes receiving, by the application server device from the depositor computing device, an acceptance of the quote.

Next, block 1812 includes sending, by the application server device to the receiver computing device, a notification of the acceptance of the quote.

In some embodiments, after receiving the acceptance of the quote, the application server device may send to the receiver computing device an image of a party associated with the depositor computing device and/or send to the depositor computing device an image of a party associated with the receiver computing device (not shown).

Turning to FIG. 18B, block 1814 includes receiving, by the application server device from the depositor computing device, a first confirmation that a party associated with the depositor computing device has provided the amount of physical cash to a party associated with the receiver computing device.

Next, block 1816 includes receiving, by the application server device from the receiver computing device, a second confirmation that the party associated with the depositor computing device has provided the amount of physical cash to the party associated with the receiver computing device.

Next, block 1818 includes debiting, by the application server device, the receiver electronic funds account by an amount equal to the amount of physical cash less the cash deposit fee.

Next, block 1820 includes crediting, by the application server device, the depositor electronic funds account by the amount equal to the amount of physical cash less the cash deposit fee.

In some embodiments, an application server device (e.g., application server 102) may simultaneously execute operations in real time on behalf of at least 30 computing devices. Each of the at least 30 computing devices may communicate with the application server device by way of a wide-area packet-switched network. In some cases, the application server device may simultaneously execute operations in real time on behalf of more or fewer than 30 computing devices. For instance, this simultaneous execution may involve 10, 20, 50, 100, or 1000 computing devices, or another extent of computing devices.

Particularly, simultaneous execution of such a large number of operations in real time necessitates computer implementation. When taking part in a banking transaction, such as the cash withdrawals and cash deposits disclosed herein, users expect results of operations to be displayed on their respective computing devices in an expeditious fashion (e.g., in real time, such as a few seconds at most per operation). Failure to do so may result in users becoming disinterested in the transaction. Consequently, the embodiments that include this simultaneous execution of a large number of operations in real time would not exist but for computer implementation thereof.

Notably, the operation of determining a receiver computing device that is located within the maximum broadcast radius (e.g., the operation at block 1802) necessitates computer implementation, especially when the depositor computing device is beyond visible range and auditory range of one or more other users of the system 100. The computer implementation herein allows the application server device to determine eligible receiver computing devices, since the application server device has access to the locations of the depositor computing device and the other users. Consequently, this feature of the disclosure herein would not exist but for computer technology.

XIV. Additional Example Embodiments

The following clauses are offered as further description of the disclosed embodiments.

(1) A method comprising:
sending, by a withdrawer computing device to an application server device, a cash withdrawal request having an associated maximum broadcast radius, wherein the withdrawer computing device is associated with a withdrawer electronic funds account, and wherein the cash withdrawal request is for a cash withdrawal of an amount of physical cash;
receiving, by the withdrawer computing device from the application server device, a quote of a cash withdrawal fee for the cash withdrawal, wherein the quote is provided by a depositor computing device located within the maximum broadcast radius, and wherein the depositor computing device is associated with a depositor electronic funds account;
obtaining, by the withdrawer computing device, an acceptance of the quote;
sending, by the withdrawer computing device to the application server device, a notification of the acceptance of the quote;
receiving, by the withdrawer computing device, an indication that a party associated with the depositor computing device has provided the amount of physical cash to a party associated with the withdrawer computing device; and
transmitting, by the withdrawer computing device to the application server device, confirmation that the cash withdrawal has been completed, wherein the withdrawer electronic funds account is debited by the amount of physical cash and the cash withdrawal fee and the depositor electronic funds account is credited by the amount of physical cash and the cash withdrawal fee at least partially in response to the confirmation that the cash withdrawal has been completed.

(2) The method of clause (1), wherein obtaining the acceptance of the quote is based on the withdrawer electronic funds account containing a value greater than or equal to the amount of physical cash and the cash withdrawal fee.

(3) The method of any of clauses (1)-(2), wherein obtaining the acceptance of the quote comprises displaying, by the withdrawer computing device, the quote.

(4) The method of any of clauses (1)-(3), further comprising:
receiving, by the withdrawer computing device from the application server device, a second quote of a second cash withdrawal fee for the cash withdrawal, wherein the second quote is provided by a second depositor computing device located within the maximum broadcast radius; and
displaying, on the withdrawer computing device, the quote and the second quote,
wherein obtaining the acceptance of the quote comprises receiving, by the withdrawer computing device, a selection of the quote.

(5) The method of any of clauses (1)-(4), wherein the depositor computing device is located beyond visual range and auditory range of the withdrawer computing device.

(6) The method of any of clauses (1)-(5), further comprising:
after sending the notification of the acceptance of the quote, (i) receiving, by the withdrawer computing device, an image of the party associated with the depositor computing device, and (ii) displaying, by the withdrawer computing device, the image of the party associated with the depositor computing device.

(7) The method of any of clauses (1)-(6), wherein the withdrawer computing device and the depositor computing device are mobile wireless computing devices.

(8) The method of any of clauses (1)-(7), wherein the cash withdrawal request specifies an expiration time of the cash withdrawal request beyond which the cash withdrawal request is no longer valid.

(9) The method of any of clauses (1)-(8), further comprising:
receiving, by the withdrawer computing device, a rating for the cash withdrawal; and
transmitting, by the withdrawer computing device to the application server device, the rating for the cash withdrawal.

(10) An article of manufacture including a non-transitory computer-readable medium, having stored thereon program instructions that, upon execution by a computing device, cause the computing device to perform the operations of any one or more of clauses (1)-(9).

(11) A computing device, comprising at least one processor, and a memory having stored thereon program instructions executable by the at least one processor to perform the operations of any one or more of clauses (1)-(9).

(12) A method comprising:
receiving, by a depositor computing device from an application server device, a cash withdrawal request, wherein the depositor computing device is associated with a depositor electronic funds account, wherein the cash withdrawal request is provided by a withdrawer computing device located within a maximum reception radius of the depositor computing device, wherein the withdrawer computing device is associated with a withdrawer electronic funds account, and wherein the cash withdrawal request is for a cash withdrawal of an amount of physical cash;
obtaining, by the depositor computing device, an acceptance of the cash withdrawal request;
sending, by the depositor computing device to the application server device, a quote of a cash withdrawal fee for the cash withdrawal;
receiving, by the depositor computing device from the application server device, a notification of an acceptance of the quote;
receiving, by the depositor computing device, an indication that a party associated with the depositor computing device has provided the amount of physical cash to a party associated with the withdrawer computing device; and
transmitting, by the depositor computing device to the application server device, confirmation that the cash withdrawal has been completed, wherein the withdrawer electronic funds account is debited by the amount of physical cash and the cash withdrawal fee and the depositor electronic funds account is credited by the amount of physical cash and the cash withdrawal fee at least partially in response to the confirmation that the cash withdrawal has been completed.

(13) The method of clause (12), wherein obtaining the acceptance of the cash withdrawal request comprises displaying, by the depositor computing device, the cash withdrawal request.

(14) The method of any of clauses (12)-(13), further comprising:
  receiving, by the depositor computing device from the application server device, a second cash withdrawal request, wherein the second cash withdrawal request is provided by a second withdrawer computing device located within the maximum reception radius, and wherein the second cash withdrawal request is for a second cash withdrawal of a second amount of physical cash;
  displaying, on the depositor computing device, the cash withdrawal request and the second cash withdrawal request, wherein obtaining the acceptance of the cash withdrawal request comprises receiving, by the depositor computing device, a selection of the cash withdrawal request.

(15) The method of any of clauses (12)-(14), wherein the depositor computing device is located beyond visual range and auditory range of the withdrawer computing device.

(16) The method of any of clauses (12)-(15), further comprising: after sending the quote, (i) receiving, by the depositor computing device, an image of the party associated with the withdrawer computing device, and (ii) displaying, by the depositor computing device, the image of the party associated with the withdrawer computing device.

(17) The method of any of clauses (12)-(16), wherein the withdrawer computing device and the depositor computing device are mobile wireless computing devices.

(18) The method of any of clauses (12)-(17), wherein the cash withdrawal request specifies an expiration time of the cash withdrawal request beyond which the cash withdrawal request is no longer valid.

(19) The method of any of clauses (12)-(18), further comprising:
  receiving, by the depositor computing device, a rating for the cash withdrawal; and
  transmitting, by the depositor computing device to the application server device, the rating for the cash withdrawal.

(20) An article of manufacture including a non-transitory computer-readable medium, having stored thereon program instructions that, upon execution by a computing device, cause the computing device to perform the operations of any one or more of clauses (12)-(19).

(21) A computing device, comprising at least one processor, and a memory having stored thereon program instructions executable by the at least one processor to perform the operations of any one or more of clauses (12)-(19).

(22) A method comprising:
  receiving, by an application server device from a withdrawer computing device, a cash withdrawal request having an associated maximum broadcast radius, wherein the withdrawer computing device is associated with a withdrawer electronic funds account, and wherein the cash withdrawal request is for a cash withdrawal of an amount of physical cash;
  determining, by the application server device, a depositor computing device that is located within the maximum broadcast radius, wherein the depositor computing device is associated with a depositor electronic funds account;
  sending, by the application server device to the depositor computing device, the cash withdrawal request;
  receiving, by the application server device from the depositor computing device, a quote of a cash withdrawal fee for the cash withdrawal;
  sending, by the application server device to the withdrawer computing device, the quote;
  receiving, by the application server device from the withdrawer computing device, an acceptance of the quote;
  sending, by the application server device to the depositor computing device, a notification of the acceptance of the quote;
  receiving, by the application server device from the withdrawer computing device, a first confirmation that a party associated with the depositor computing device has provided the amount of physical cash to a party associated with the withdrawer computing device;
  receiving, by the application server device from the depositor computing device, a second confirmation that the party associated with the depositor computing device has provided the amount of physical cash to the party associated with the withdrawer computing device;
  debiting, by the application server device, the withdrawer electronic funds account by the amount of physical cash and the cash withdrawal fee; and
  crediting, by the application server device, the depositor electronic funds account by the amount of physical cash and the cash withdrawal fee.

(23) The method of clause (22), further comprising:
  determining, by the application server device, a second depositor computing device that is located within the maximum broadcast radius;
  sending, by the application server device to the second depositor computing device, the cash withdrawal request;
  receiving, by the application server device from the second depositor computing device, a second quote of a second cash withdrawal fee for the cash withdrawal; and
  sending, by the application server device to the withdrawer computing device, the second quote.

(24) The method of any of clauses (22)-(23), further comprising:
  after receiving the acceptance of the quote, sending, by the application server device to the depositor computing device, an image of the party associated with the withdrawer computing device.

(25) The method of any of clauses (22)-(24), further comprising:
  after receiving the acceptance of the quote, sending, by the application server device to the withdrawer computing device, an image of the party associated with the depositor computing device.

(26) The method of any of clauses (22)-(25), wherein the withdrawer computing device and the depositor computing device are mobile wireless computing devices.

(27) The method of any of clauses (22)-(26), wherein the cash withdrawal request specifies an expiration time of the cash withdrawal request beyond which the cash withdrawal request is no longer valid.

(28) The method of any of clauses (22)-(27), further comprising:
  sending, by the application server device to the depositor computing device with the cash withdrawal request, a rating of the party associated with the withdrawer computing device; and
  sending, by the application server device to the withdrawer computing device with the quote, a rating of the party associated with the depositor computing device.

(29) The method of any of clauses (22)-(28), further comprising:
  determining, by the application server device, that the withdrawer computing device is located within a maximum reception radius associated with the depositor computing device,
  wherein sending the cash withdrawal request comprises sending the cash withdrawal request at least in response to determining that the withdrawer computing device is located within the maximum reception radius.

(30) The method of any of clauses (22)-(29), further comprising:
  determining, by the application server device that the withdrawer electronic funds account contains a value greater than the amount of physical cash,
  wherein sending the cash withdrawal request comprises sending the cash withdrawal request at least in response to determining that the withdrawer electronic funds account contains the value greater than the amount of physical cash.

(31) An article of manufacture including a non-transitory computer-readable medium, having stored thereon program instructions that, upon execution by a computing device, cause the computing device to perform the operations of any one or more of clauses (22)-(30).

(32) A computing device, comprising at least one processor, and a memory having stored thereon program instructions executable by the at least one processor to perform the operations of any one or more of clauses (22)-(30).

(33) A method comprising:
  sending, by a depositor computing device to an application server device, a cash deposit request having an associated maximum broadcast radius, wherein the depositor computing device is associated with a depositor electronic funds account, and wherein the cash deposit request is for a cash deposit of an amount of physical cash;
  receiving, by the depositor computing device from the application server device, a quote of a cash deposit fee for the cash deposit, wherein the quote is provided by a receiver computing device located within the maximum broadcast radius, and wherein the receiver computing device is associated with a receiver electronic funds account;
  obtaining, by the depositor computing device, an acceptance of the quote;
  sending, by the depositor computing device to the application server device, a notification of the acceptance of the quote;
  receiving, by the depositor computing device, an indication that a party associated with the depositor computing device has provided the amount of physical cash to a party associated with the receiver computing device; and
  transmitting, by the depositor computing device to the application server device, confirmation that the cash deposit has been completed, wherein the receiver electronic funds account is debited by an amount equal to the amount of physical cash less the cash deposit fee and the depositor electronic funds account is credited by the amount equal to the amount of physical cash less the cash deposit fee at least partially in response to the confirmation that the cash deposit has been completed.

(34) The method of clause (33), wherein obtaining the acceptance of the quote comprises displaying, by the depositor computing device, the quote.

(35) The method of any of clauses (33)-(34), further comprising:
  receiving, by the depositor computing device from the application server device, a second quote of a second cash deposit fee for the cash deposit, wherein the second quote is provided by a second receiver computing device located within the maximum broadcast radius; and
  displaying, on the depositor computing device, the quote and the second quote,
  wherein obtaining the acceptance of the quote comprises receiving, by the depositor computing device, a selection of the quote.

(36) The method of any of clauses (33)-(35), wherein the receiver computing device is located beyond visual range and auditory range of the depositor computing device.

(37) The method of any of clauses (33)-(36), further comprising:
  after sending the notification of the acceptance of the quote, (i) receiving, by the depositor computing device, an image of the party associated with the receiver computing device, and (ii) displaying, by the depositor computing device, the image of the party associated with the receiver computing device.

(38) The method of any of clauses (33)-(37), wherein the depositor computing device and the receiver computing device are mobile wireless computing devices.

(39) The method of any of clauses (33)-(38), wherein the cash deposit request specifies an expiration time of the cash deposit request beyond which the cash deposit request is no longer valid.

(40) The method of any of clauses (33)-(39), further comprising:
  receiving, by the depositor computing device, a rating for the cash deposit; and
  transmitting, by the depositor computing device to the application server device, the rating for the cash deposit.

(41) An article of manufacture including a non-transitory computer-readable medium, having stored thereon program instructions that, upon execution by a computing device, cause the computing device to perform the operations of any one or more of clauses (33)-(40).

(42) A computing device, comprising at least one processor, and a memory having stored thereon program instructions executable by the at least one processor to perform the operations of any one or more of clauses (33)-(40).

(43) A method comprising:
  receiving, by a receiver computing device from an application server device, a cash deposit request, wherein the receiver computing device is associated with a receiver electronic funds account, wherein the cash deposit request is provided by a depositor computing device located within a maximum reception radius of the receiver computing device, wherein the depositor computing device is associated with a depositor electronic funds account, and wherein the cash deposit request is for a cash deposit of an amount of physical cash;
  obtaining, by the receiver computing device, an acceptance of the cash deposit request;
  sending, by the receiver computing device to the application server device, a quote of a cash deposit fee for the cash deposit;
  receiving, by the receiver computing device from the application server device, a notification of an acceptance of the quote;

receiving, by the receiver computing device, an indication that a party associated with the depositor computing device has provided the amount of physical cash to a party associated with the receiver computing device; and transmitting, by the receiver computing device to the application server device, confirmation that the cash deposit has been completed, wherein the receiver electronic funds account is debited by an amount equal to the amount of physical cash less the cash deposit fee and the depositor electronic funds account is credited by the amount equal to the amount of physical cash less the cash deposit fee at least partially in response to the confirmation that the cash deposit has been completed.

(44) The method of clause (43), wherein obtaining the acceptance of the cash deposit request comprises displaying, by the receiver computing device, the cash deposit request.

(45) The method of any of clauses (43)-(44), wherein obtaining the acceptance of the cash deposit request is based on the receiver electronic funds account containing a value greater than the amount of physical cash.

(46) The method of any of clauses (43)-(45), further comprising:
receiving, by the receiver computing device from the application server device, a second cash deposit request, wherein the second cash deposit request is provided by a second depositor computing device located within the maximum reception radius, and wherein the second cash deposit request is for a second cash deposit of a second amount of physical cash;
displaying, on the receiver computing device, the cash deposit request and the second cash deposit request, wherein obtaining the acceptance of the cash deposit request comprises receiving, by the receiver computing device, a selection of the cash deposit request.

(47) The method of any of clauses (43)-(46), wherein the receiver computing device is located beyond visual range and auditory range of the depositor computing device.

(48) The method of any of clauses (43)-(47), further comprising:
after sending the quote, (i) receiving, by the receiver computing device, an image of the party associated with the depositor computing device, and (ii) displaying, by the receiver computing device, the image of the party associated with the depositor computing device.

(49) The method of any of clauses (43)-(48), wherein the depositor computing device and the receiver computing device are mobile wireless computing devices.

(50) The method of any of clauses (43)-(49), wherein the cash deposit request specifies an expiration time of the cash deposit request beyond which the cash deposit request is no longer valid.

(51) The method of any of clauses (43)-(50), further comprising:
receiving, by the receiver computing device, a rating for the cash deposit; and
transmitting, by the receiver computing device to the application server device, the rating for the cash deposit.

(52) An article of manufacture including a non-transitory computer-readable medium, having stored thereon program instructions that, upon execution by a computing device, cause the computing device to perform the operations of any one or more of clauses (43)-(50).

(53) A computing device, comprising at least one processor, and a memory having stored thereon program instructions executable by the at least one processor to perform the operations of any one or more of clauses (43)-(50).

(54) A method comprising:
receiving, by an application server device from a depositor computing device, a cash deposit request having an associated maximum broadcast radius, wherein the depositor computing device is associated with a depositor electronic funds account, and wherein the cash deposit request is for a cash deposit of an amount of physical cash;
determining, by the application server device, a receiver computing device that is located within the maximum broadcast radius, wherein the receiver computing device is associated with a receiver electronic funds account;
sending, by the application server device to the receiver computing device, the cash deposit request;
receiving, by the application server device from the receiver computing device, a quote of a cash deposit fee for the cash deposit;
sending, by the application server device to the depositor computing device, the quote;
receiving, by the application server device from the depositor computing device, an acceptance of the quote;
sending, by the application server device to the receiver computing device, a notification of the acceptance of the quote;
receiving, by the application server device from the depositor computing device, a first confirmation that a party associated with the depositor computing device has provided the amount of physical cash to a party associated with the receiver computing device;
receiving, by the application server device from the receiver computing device, a second confirmation that the party associated with the depositor computing device has provided the amount of physical cash to the party associated with the receiver computing device;
debiting, by the application server device, the receiver electronic funds account by an amount equal to the amount of physical cash less the cash deposit fee; and
crediting, by the application server device, the depositor electronic funds account by the amount equal to the amount of physical cash less the cash deposit fee.

(55) The method of clause (54), further comprising:
determining, by the application server device, a second receiver computing device that is located within the maximum broadcast radius;
sending, by the application server device to the second receiver computing device, the cash deposit request;
receiving, by the application server device from the second receiver computing device, a second quote of a second cash deposit fee for the cash deposit; and
sending, by the application server device to the depositor computing device, the second quote.

(56) The method of any of clauses (54)-(55), further comprising: after receiving the acceptance of the quote, sending, by the application server device to the receiver computing device, an image of the party associated with the depositor computing device.

(57) The method of any of clauses (54)-(56), further comprising:
after receiving the acceptance of the quote, sending, by the application server device to the depositor computing device, an image of the party associated with the receiver computing device.

(58) The method of any of clauses (54)-(57), wherein the depositor computing device and the receiver computing device are mobile wireless computing devices.

(59) The method of any of clauses (54)-(58), wherein the cash deposit request specifies an expiration time of the cash deposit request beyond which the cash deposit request is no longer valid.

(60) The method of any of clauses (54)-(59), further comprising:
sending, by the application server device to the receiver computing device with the cash deposit request, a rating of the party associated with the depositor computing device; and
sending, by the application server device to the depositor computing device with the quote, a rating of the party associated with the receiver computing device.

(61) The method of any of clauses (54)-(60), further comprising:
determining, by the application server device, that the depositor computing device is located within a maximum reception radius associated with the receiver computing device,
wherein sending the cash deposit request comprises sending the cash deposit request at least in response to determining that the depositor computing device is located within the maximum reception radius.

(62) The method of any of clauses (54)-(61), further comprising:
determining, by the application server device that the depositor electronic funds account contains a value greater than the amount of physical cash,
wherein sending the cash deposit request comprises sending the cash deposit request at least in response to determining that the depositor electronic funds account contains the value greater than the amount of physical cash.

(63) An article of manufacture including a non-transitory computer-readable medium, having stored thereon program instructions that, upon execution by a computing device, cause the computing device to perform the operations of any one or more of clauses (54)-(62).

(64) A computing device, comprising at least one processor, and a memory having stored thereon program instructions executable by the at least one processor to perform the operations of any one or more of clauses (54)-(62).

XV. Conclusion

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the invention can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

What is claimed is:

1. A method comprising:

launching a banking application at a withdrawer computing device comprising a processor, a user interface, and a global positioning system receiver;

activating, at the withdrawer computing device, personal automated teller machine (ATM) functionality of the banking application in response to use of an activation icon displayed by the banking application on the user interface;

determining, at the processor using the global positioning system receiver, a location of the withdrawer computing device;

sending, by the withdrawer computing device to an application server device, a cash transaction request having an associated maximum broadcast radius extending from the location of the withdrawer computing device, wherein the cash transaction request is for a peer-to-peer cash exchange of an amount of physical cash;

receiving, at the application server device from a depositor computing device, a transmission that indicates personal ATM application functionality at the depositor computing device is activated and that contains data indicating a location of the depositor computing device;

determining, at the application server device, the location of the depositor computing device is within the associated maximum broadcast radius extending from the location of the withdrawer computing device;

determining, at the application server device, the personal ATM functionality at the depositor computing device is activated thereby making a party associated with the depositor computing device eligible to participate in the peer-to-peer cash exchange;

receiving, by the withdrawer computing device from the application server device, a quote for the peer-to-peer cash exchange, wherein:
the quote includes an offer to participate in the peer-to-peer cash exchange,
the first is by the party associated with the first depositor computing device,
the offer includes a non-zero transaction fee, requested by the party associated with the first depositor computing device, to participate in the peer-to-peer cash exchange, and
the quote indicates a distance from the location of the withdrawer computing device to a location of the depositor computing device, displaying, by the withdrawer computing device, the quote;

obtaining, by the withdrawer computing device, an acceptance of the quote;

sending, by the withdrawer computing device to the application server device, a notification of the acceptance of the quote; and after sending the notification of the acceptance of the quote, displaying, by the withdrawer computing device, a map indicating the location of the withdrawer computing device and a suggested safe location for a party associated with the withdrawer computing device and the party associated with the depositor computing device to meet to perform the peer-to-peer cash exchange.

2. The method of claim 1, further comprising:
after sending the notification of the acceptance of the quote, (i) receiving, by the withdrawer computing device, the location of the party associated with the depositor computing device, and (ii) displaying, by the withdrawer computing device, a map indicating the location of the party associated with the depositor computing device.

3. The method of claim 1, wherein the withdrawer computing device is a mobile wireless computing device.

4. The method of claim 1, wherein the cash transaction request specifies an expiration time of the cash transaction request beyond which the cash transaction request is no longer valid.

5. The method of claim 1, further comprising:
receiving, by the withdrawer computing device, a rating for the peer-to-peer cash exchange; and
transmitting, by the withdrawer computing device to the application server device, the rating for the peer-to-peer cash exchange.

6. The method of claim 1:
wherein the cash transaction request is a cash withdrawal request for a cash withdrawal of the amount of physical cash.

7. The method of claim 6:
wherein the withdrawer computing device is associated with a withdrawer electronic funds account,
wherein the depositor computing device is associated with a depositor electronic funds account, and
wherein obtaining the acceptance of the quote is based on the withdrawer electronic funds account containing a value greater than or equal to the amount of physical cash and the non-zero transaction fee.

8. The method of claim 1:
wherein the cash transaction request is a cash deposit request for a cash deposit of the amount of physical cash.

9. The method of claim 1, wherein the quote includes a distance from the location of the withdrawer computing device to a location of the depositor computing device.

10. The method of claim 1, wherein the quote includes an elapsed time since the application server device received the quote from the depositor computing device.

11. The method of claim 1, wherein the offer is based on a rating associated with the party associated with the withdrawer computing device and the distance from the location of the withdrawer computing device to a location of the depositor computing device.

12. The method of claim 1, wherein the suggested safe location is a government facility that is different from a location of the party associated with the depositor computing device.

13. The method of claim 1, further comprising:
receiving an image of the party associated with the first depositor computing device; and
displaying the image of the party associated with the first depositor computing device.

14. The method of claim 1, further comprising:
receiving, by the withdrawer computing device from the application server device after sending the notification of the acceptance of the quote, an image of the party associated with the depositor computing device; and
displaying, by the withdrawer computing device, the image of the party associated with the depositor computing device before performance of the peer-to-peer cash exchange.

15. The method of claim 6, further comprising:
completing the cash withdrawal, wherein completing the cash withdrawal includes the application server device debiting an electronic funds account associated with the party associated with the withdrawer computing device by a debit amount of funds and transferring the debit amount of funds to an escrow account associated with the application server device; and receiving, by the withdrawer computing device, a confirmation that the cash withdrawal of the amount of physical cash has been completed, wherein the debit amount of funds equals the amount of physical cash and the first non-zero transaction fee.

16. The method of claim 15, wherein completing the cash withdrawal further includes the application server device crediting an electronic funds account associated with the party associated with the depositor computing device by the debit amount of funds.

17. The method of claim 1, wherein the personal ATM functionality at the withdrawer computing device is deactivated automatically in response to a permission to use location services being declined for the withdrawer computing device.

18. The method of claim 1, wherein the withdrawer computing device receives the quote after the application server device determines one or more of the following:
   a balance of funds in a mobile wallet corresponding to the party associated with the withdrawer computing device is sufficient to cover the peer-to-peer cash exchange of the amount of physical cash,
   a balance of funds in a mobile wallet corresponding to the party associated with the depositor computing device is sufficient to cover the peer-to-peer cash exchange of the amount of physical cash, or
   a sum of the amount of physical cash and the non-zero transaction fee is within a range of a minimum and maximum cash withdrawal or cash deposit amount set for a party associated with the depositor computing device.

19. A computing system comprising:
   an application server device comprising a first processor and a memory comprising first program instructions executable by the first processor to perform first operations, wherein the first operations include receiving, at the application server device from a depositor computing device, a transmission that indicates personal ATM functionality at the depositor computing device is activated and that contains data indicating a location of the depositor computing device; and
   a withdrawer computing device comprising:
      a global positioning system receiver,
      a user interface,
      a second processor, and
      a memory having stored thereon second program instructions executable by the second processor to perform second operations, wherein the second operations include:
         launching a banking application at the withdrawer computing device,
         activating, at the withdrawer computing device, personal automated teller machine (ATM) functionality of the banking application in response to use of an activation icon displayed by the banking application on the user interface,
         determining, at the second processor using the global positioning system receiver, a location of the withdrawer computing device, and
         sending, to the application server device, a cash transaction request having an associated maximum broadcast radius extending from the location of the withdrawer computing device, wherein the cash transaction request is for a peer-to-peer cash exchange of an amount of physical cash, wherein the first operations further include:
   determining, at the application server device, the location of the depositor computing device is within the associated maximum broadcast radius extending from the location of the withdrawer computing device, and
   determining, at the application server device, the personal ATM functionality at the depositor computing device is activated thereby making a party associated with the depositor computing device eligible to participate in the peer-to-peer cash exchange; and
wherein the second operations further include:
   receiving, by the withdrawer computing device from the application server device, a quote for the peer-to-peer cash exchange, wherein:
      the quote includes a first offer to participate in the peer-to-peer cash exchange,
      the first offer is by the party associated with the depositor computing device,
      the first offer includes a first non-zero transaction fee, requested by the party associated with the depositor computing device to participate in the peer-to-peer cash exchange, and
      the quote indicates a distance from the location of the withdrawer computing device to a location of the depositor computing device,
   displaying the quote,
   obtaining an acceptance of the first quote,
   sending, to the application server device, a notification of the acceptance of the quote, and
      after sending the notification of the acceptance of the quote, displaying a map indicating the location of the withdrawer computing device and a suggested safe location for a party associated with the withdrawer computing device and the party associated with the depositor computing device to meet to perform the peer-to-peer cash exchange.

20. The computing system of claim 19, wherein the second operations further comprise:
   after sending the notification of the acceptance of the quote, (i) receiving the location of the party associated with the depositor computing device, and (ii) displaying a map indicating the location of the party associated with the depositor computing device.

21. A method comprising:
   launching a banking application at a withdrawer computing device comprising a processor, a user interface, and a global positioning system receiver;
   activating, at the withdrawer computing device, personal automated teller machine (ATM) functionality of the banking application in response to use of an activation icon displayed by the banking application on the user interface;
   determining, at the processor using the global positioning system receiver, a location of the withdrawer computing device;
   sending, by the withdrawer computing device to an application server device, a cash withdrawal request having an associated maximum broadcast radius extending from the location of the withdrawer computing device, wherein the withdrawer computing device is associated with a withdrawer electronic funds account, and wherein the cash withdrawal request is for a peer-to-peer cash withdrawal of an amount of physical cash;
   receiving, at the application server device from a depositor computing device, a transmission that indicates personal ATM functionality at the depositor computing device is activated and that contains data indicating a location of the depositor computing device;

determining, at the application server device, the location of the depositor computing device is within the associated maximum broadcast radius extending from the location of the withdrawer computing device;

determining, at the application server device, the depositor computing device has the personal ATM functionality activated thereby making a party associated with the depositor computing device eligible to participate in the peer-to-peer cash withdrawal;

receiving, by the withdrawer computing device from the application server device, a quote for the peer-to-peer cash withdrawal, wherein:
- the quote includes a first offer to participate in the peer-to-peer cash withdrawal,
- the first offer by the party associated with the depositor computing device,
- the first offer includes a first non-zero cash withdrawal fee requested by the party associated with the depositor computing device to participate in the peer-to-peer cash withdrawal,
- the depositor computing device is associated with a depositor electronic funds account; and
- the quote indicates a distance from the location of the withdrawer computing device to a location of the depositor computing device, displaying, by the withdrawer computing device, the quote;

obtaining, by the withdrawer computing device, an acceptance of the quote;

sending, by the withdrawer computing device to the application server device, a notification of the acceptance of the quote;

displaying, by the withdrawer computing device, a map indicating the location of the withdrawer computing device and a suggested safe location for a party associated with the withdrawer computing device and the party associated with the depositor computing device to meet to perform the peer-to-peer cash withdrawal;

receiving, by the withdrawer computing device, an indication that the party associated with the depositor computing device has provided the amount of physical cash to the party associated with the withdrawer computing device; and transmitting, by the withdrawer computing device to the application server device, confirmation that the peer-to-peer cash withdrawal has been completed, wherein the withdrawer electronic funds account is debited by the amount of physical cash and the first non-zero cash withdrawal fee and the depositor electronic funds account is credited by the amount of physical cash and the first non-zero cash withdrawal fee at least partially in response to the confirmation that the peer-to-peer cash withdrawal has been completed.

22. The method of claim 21, wherein obtaining the acceptance of the quote is based on the withdrawer electronic funds account containing a value greater than or equal to the amount of physical cash and the first non-zero cash withdrawal fee.

* * * * *

UNITED STATES PATENT AND TRADEMARK OFFICE
CERTIFICATE OF CORRECTION

PATENT NO. : 12,260,382 B2  
APPLICATION NO. : 15/748594  
DATED : March 25, 2025  
INVENTOR(S) : David de Villiers and Martin Paul Moshal Page 1 of 1

It is certified that error appears in the above-identified patent and that said Letters Patent is hereby corrected as shown below:

In the Claims

Claim 1, Column 39, Line 39 should read:
the offer is by the party associated with the deposi- Claim 1, Column 39, Line 42 should read:
by the party associated with the depositor com- Signed and Sealed this
First Day of July, 2025

Coke Morgan Stewart
*Acting Director of the United States Patent and Trademark Office*